US009578652B2

(12) United States Patent
Seo et al.

(10) Patent No.: US 9,578,652 B2
(45) Date of Patent: Feb. 21, 2017

(54) METHOD AND APPARATUS FOR TRANSMITTING DATA IN A WIRELESS COMMUNICATION SYSTEM

(75) Inventors: Dong Youn Seo, Anyang-si (KR); Han Byul Seo, Anyang-si (KR); Suck Chel Yang, Anyang-si (KR); Joon Kui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 89 days.

(21) Appl. No.: 14/234,368

(22) PCT Filed: Jul. 25, 2012

(86) PCT No.: PCT/KR2012/005939
§ 371 (c)(1),
(2), (4) Date: Jan. 22, 2014

(87) PCT Pub. No.: WO2013/015613
PCT Pub. Date: Jan. 31, 2013

(65) Prior Publication Data
US 2014/0161088 A1    Jun. 12, 2014

Related U.S. Application Data

(60) Provisional application No. 61/511,540, filed on Jul. 25, 2011.

(51) Int. Cl.
*H04J 1/00*     (2006.01)
*H04W 72/12*    (2009.01)
(Continued)

(52) U.S. Cl.
CPC ......... *H04W 72/1278* (2013.01); *H04L 5/003* (2013.01); *H04L 5/0044* (2013.01);
(Continued)

(58) Field of Classification Search
None
See application file for complete search history.

(56) References Cited

U.S. PATENT DOCUMENTS

2008/0025338 A1* 1/2008 Gorokhov ............ H04L 1/1819
370/441
2008/0089281 A1* 4/2008 Yoon ................... H04W 72/042
370/329
(Continued)

FOREIGN PATENT DOCUMENTS

EP      2077646          7/2009
JP      EP 1944896 A1 *  7/2008  .......... H04L 1/0017
(Continued)

OTHER PUBLICATIONS

3rd Generation Partnership Project (3GPP), "Technical Specification Group Radio Access Network; Evolved Universal Terrestrial Radio Access (E-UTRA); Physical Layer Procedures (Release 10)," 3GPP TS 36.213 V10.2.0, Jun. 2011, 120 pages.

(Continued)

*Primary Examiner* — Kwang B Yao
*Assistant Examiner* — Juvena Loo
(74) *Attorney, Agent, or Firm* — Lee, Hong, Degerman, Kang & Waimey

(57) ABSTRACT

Provided are a method and apparatus for transmitting data in a wireless communication system. The method comprises the steps of: setting up a frame including both a control domain for transmitting scheduling information to a first terminal and a data domain for transmitting first data to the first terminal; and transmitting, to a second terminal, second data in the control domain. The frame comprises a plurality of orthogonal frequency division multiplexing (OFDM) symbols in a time domain. The control domain consists of a first number N (where N is any natural number equal to or less than 4) of OFDM symbols in the frame. The data (Continued)

domain consists of OFDM symbols other than a number N of OFDM symbols in the frame. The second data has a predetermined bit size.

20 Claims, 16 Drawing Sheets

(51) Int. Cl.
  *H04W 52/02* (2009.01)
  *H04L 5/00* (2006.01)
(52) U.S. Cl.
  CPC ....... *H04L 5/0053* (2013.01); *H04W 52/0216* (2013.01); *H04W 52/0219* (2013.01); *H04L 5/0037* (2013.01); *H04L 5/0048* (2013.01); *H04L 5/0055* (2013.01)

(56) References Cited

U.S. PATENT DOCUMENTS

| | | | |
|---|---|---|---|
| 2008/0101281 A1* | 5/2008 | Harris | H04L 69/04 370/328 |
| 2010/0077272 A1* | 3/2010 | Peisa et al. | 714/748 |
| 2010/0098020 A1* | 4/2010 | Kim | H04L 1/0027 370/330 |
| 2010/0165847 A1* | 7/2010 | Kamuf et al. | 370/241 |
| 2010/0246427 A1* | 9/2010 | Gheorghiu | H04L 1/007 370/252 |
| 2011/0047430 A1* | 2/2011 | Feuersanger | H04L 1/1812 714/748 |
| 2011/0051681 A1 | 3/2011 | Ahn et al. | |
| 2011/0085458 A1* | 4/2011 | Montojo et al. | 370/252 |
| 2011/0188460 A1* | 8/2011 | Malladi | H04W 52/58 370/329 |
| 2011/0268046 A1* | 11/2011 | Choi | H04L 5/0007 370/329 |
| 2012/0113827 A1* | 5/2012 | Yamada et al. | 370/252 |
| 2013/0021948 A1* | 1/2013 | Moulsley | 370/254 |

FOREIGN PATENT DOCUMENTS

| | | |
|---|---|---|
| JP | 2008-193648 | 8/2008 |
| JP | 2008-236434 | 10/2008 |
| KR | 10-2010-0019957 | 2/2010 |
| WO | 2006/012405 | 2/2006 |

OTHER PUBLICATIONS

European Patent Office Application Serial No. 12818438.9, Search Report dated Jan. 26, 2015, 8 pages.

* cited by examiner

METHOD AND APPARATUS FOR TRANSMITTING DATA IN A WIRELESS COMMUNICATION SYSTEM

CROSS-REFERENCE TO RELATED APPLICATIONS

This application is the National Stage filing under 35 U.S.C. 371 of International Application No. PCT/KR2012/005939, filed on Jul. 25, 2012, which claims the benefit of U.S. Provisional Application Ser. No. 61/511,540, filed on Jul. 25, 2011, the contents of which are all hereby incorporated by reference herein in their entirety.

BACKGROUND OF THE INVENTION

Field of the Invention

The present invention relates to wireless communication and, more particularly, to a method and apparatus for transmitting data in a wireless communication system.

Related Art

A $3^{rd}$ Generation Partnership Project (3GPP) Long Term Evolution (hereinafter referred to as LTE) is a leading next-generation wireless communication system standard. In LTE, when a base station sends downlink data to a terminal, the base station first sends scheduling information about a downlink data channel through a control channel, assigns a downlink data channel based on the scheduling information, and sends the downlink data through the assigned downlink data channel. Even when a terminal sends uplink data to a base station, the base station first sends scheduling information about an uplink data channel to the terminal through a control channel, and the terminal sends uplink data through an uplink data channel assigned based on the scheduling information.

Meanwhile, 3GPP Long Term Evolution-Advanced (hereinafter referred to as LTE-A) is the next-generation wireless communication system standard improved from LTE. In LTE-A, low-priced/low-specification terminals which chiefly perform data communication, such as the metering of a meter, the measurement of a water level, the utilization of a surveillance camera, and a report on the inventory of a vending machine, can be supported. A low-priced/low-specification terminal which chiefly performs low-capacity data communication as described above is called a Machine Type Communication (MTC) device.

An MTC device may have a small amount of transmission data, and the number of devices that need to be supported by one base station within a cell may be many. For such characteristics, an existing data transmission method, that is, a method of transmitting scheduling information about each data channel through a control channel may have low efficiency in terms of the utilization of resources.

SUMMARY OF THE INVENTION

A method and apparatus for transmitting data in a wireless communication system are sought to be provided.

In an aspect, there is provided a method of transmitting data in a wireless communication system. The method includes steps of configuring a frame including a control region in which scheduling information is transmitted to first UE and a data region in which first data is transmitted to the first UE and sending second data to second UE in the control region, wherein the frame includes a plurality of Orthogonal Frequency Division Multiplexing (OFDM) symbols in a time domain, the control region includes first N (N is any one of natural number of 4 or less) OFDM symbols in the frame, the data region includes OFDM symbols other than the N OFDM symbols in the frame, and the second data has a previously agreed bit size.

The scheduling information and the second data may have the same bit size, the scheduling information may be masked as a first identifier (ID), the second data may be masked as a second ID, and the first ID and the second ID are different UE-specific IDs.

The scheduling information and the second data may have different bit sizes.

The scheduling information and the data may include an indicator of 1 bit, and any one of the scheduling information and the second data may be indicated by a value of the indicator of 1 bit.

The method may further include a step of receiving acknowledgement (ACK) for the second data.

The second data may include a Transmission Power Control (TPC) field, and the TPC field may indicate a transmission power value of the ACK.

The method may further include a step of configuring a search space that is a radio resource region in which the second data is capable of being transmitted in the second UE.

The method may further include a step of configuring an additional control region within the data region in the frame, wherein the second data may be transmitted in the additional control region.

The second data may include a New Data Indicator (NDI) field of M (M is a natural number of 2 or more) bits, and a value of the M-bit NDI field may indicate whether the second data is newly transmitted data or somethingth retransmission data.

The M-bit NDI field may have a first bit value if the second data is newly transmitted data and have any one of second bit values if the second data is retransmitted data, and the second bit values may overlap with the first bit value.

The second data may have a smaller amount of data than the first data.

The frame may include a plurality of subframes including the control region and the data region, and the second data may be transmitted in only some of the plurality of subframes.

A first search space that is a radio resource region in which the scheduling information is capable of being transmitted and a second search space that is a radio resource region in which the second data is capable of being transmitted may be distinguished from each other and configured.

A data transmission apparatus provided in another aspect includes a Radio Frequency (RF) unit transmitting and receiving radio signals and a processor connected to the RF unit, wherein the processor configures a frame including a control region in which scheduling information is transmitted to first UE and a data region in which first data is transmitted to the first UE and sends second data to second UE in the control region, the frame may include a plurality of Orthogonal Frequency Division Multiplexing (OFDM) symbols in a time domain, the control region may include first N (N is any one of natural number of 4 or less) OFDM symbols in the frame, and the data region may include OFDM symbols other than the N OFDM symbols in the frame, and the second data has a previously agreed bit size.

In a wireless communication system which supports an MTC device, the waste of radio resources can be prevented, and data communication can be efficiently performed.

DESCRIPTION OF EXEMPLARY EMBODIMENTS

User Equipment (UE) may be fixed or mobile and may be called another term, such as a Mobile Station (MS), a Mobile Terminal (MT), a User Terminal (UT), a Subscriber Station (SS), a wireless device, a Personal Digital Assistant (PDA), a wireless modem, or a handheld device.

A Base Station: BS (BS) commonly refers to a fixed station that communicates with UE and may be called another term, such as an evolved-NodeB (eNB), a Base Transceiver System (BTS), or an access point.

Hereinafter, the present invention is illustrated as being applied to 3GPP Long Term Evolution (LTE) based on $3^{rd}$ Generation Partnership Project (3GPP) Technical Specification (TS) Release 8 or 3GPP LTE-A based on standards subsequent to 3GPP TS Release 10 or later. This is only an example, and the present invention can be applied to various wireless communication networks.

Figure 1:
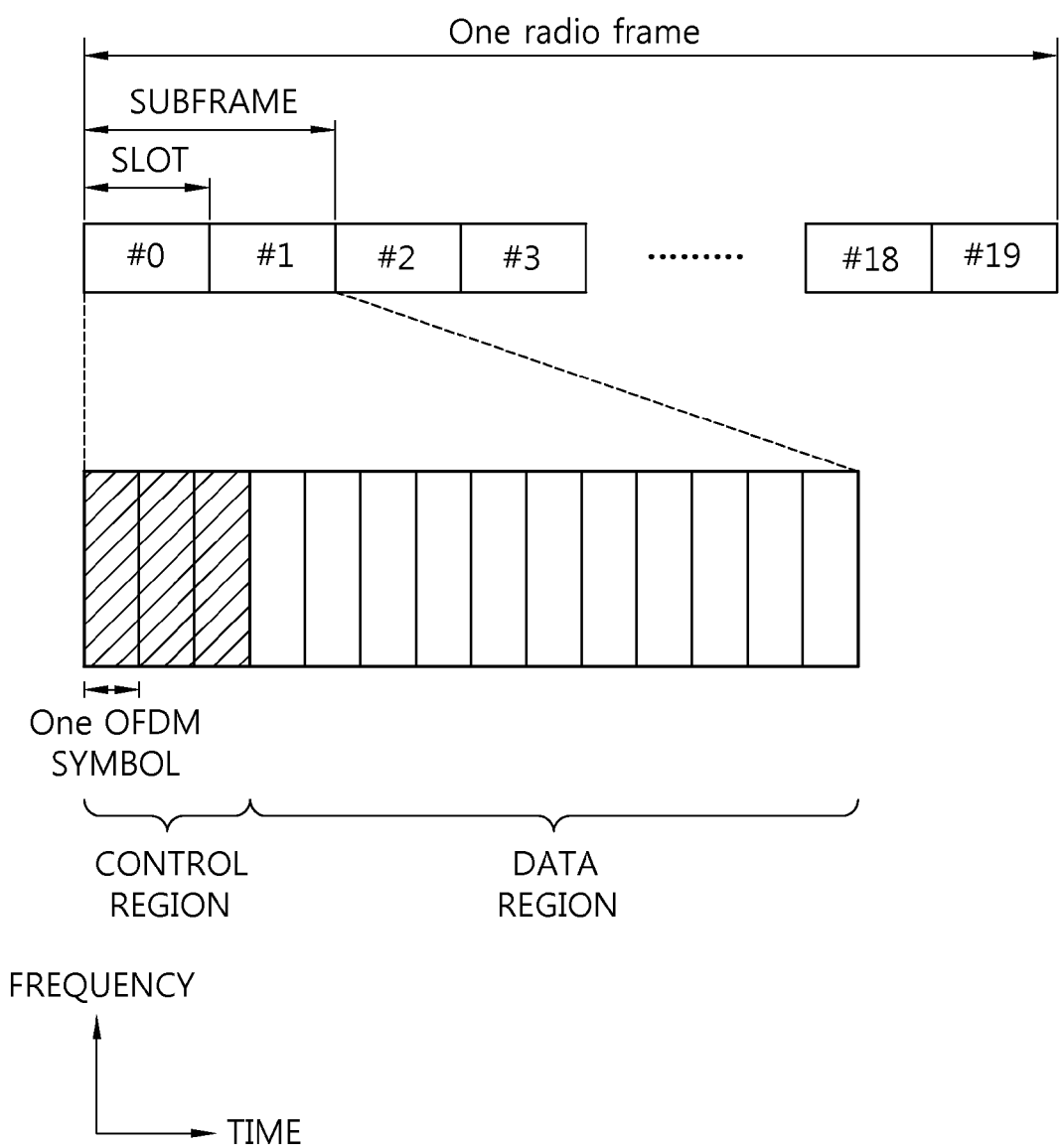
FIG. 1 shows the structure of a downlink radio frame in 3GPP LTE-A.

FIG. 1 shows the structure of a downlink radio frame in 3GPP LTE-A. For the structure, reference may be made to Paragraph 6 of 3GPP TS 36.211 V10.2.0 (2011-06) "Evolved Universal Terrestrial Radio Access (E-UTRA); Physical Channels and Modulation (Release 10)".

The radio frame includes 10 subframes assigned by indices 0-9. One subframe includes two consecutive slots. The time that is taken for one subframe to be transmitted is called a Transmission Time Interval (TTI). For example, the length of one subframe may be 1 ms, and the length of one slot may be 0.5 ms.

One slot may include a plurality of Orthogonal Frequency Division Multiplexing (OFDM) symbols in a time domain. The OFDM symbol is only for representing one symbol period in the time domain because 3GPP LTE uses Orthogonal Frequency Division Multiple Access (OFDMA) in downlink (DL), but there is no limit to a multiple access method or name. For example, an OFDM symbol may be called another term, such as a Single Carrier-Frequency Division Multiple Access (SC-FDMA) symbol or a symbol period.

One slot is illustrated as including 7 OFDM symbols, but the number of OFDM symbols included in one slot may be changed depending on the length of a Cyclic Prefix (CP). In accordance with 3GPP TS 36.211 V10.2.0, 1 slot includes 7 OFDM symbols in a normal CP, and 1 slot includes 6 OFDM symbols in an extended CP.

A Resource Block (RB) is a resource assignment unit and includes a plurality of subcarriers in one slot. For example, if one slot includes 7 OFDM symbols in the time domain and an RB includes 12 subcarriers in the frequency domain, one RB may include 7×12 Resource Elements (REs).

A DL subframe is divided into a control region and a data region in the time domain. The control region includes a maximum of former 4 OFDM symbols of a first slot within the subframe, but the number of OFDM symbols included in the control region may be changed. A Physical Downlink Control Channel (PDCCH) and other control channels are assigned to the control region, and a PDSCH, that is, a data channel, is assigned to the data region.

As disclosed in 3GPP TS 36.211 V10.2.0, in 3GPP LTE/LTE-A, a physical channel may be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. UE first receives a CFI on a PCFICH and then monitors a PDCCH.

Unlike a PDCCH, a PCFICH is transmitted through the fixed PCFICH resources of a subframe without using blind decoding.

A PHICH carries a positive-acknowledgement (ACK)/negative-acknowledgement (NACK) signal for an UL Hybrid Automatic Repeat Request (HARQ). An ACK/NACK signal for UL data on a PUSCH which is transmitted by UE is transmitted on a PHICH.

A Physical Broadcast Channel (PBCH) is transmitted in the former 4 OFDM symbols of the second slot of the first subframe of a radio frame. A PBCH carries system information that is essential for UE to communicate with a BS, and system information transmitted through a PBCH is called a Master Information Block (MIB). In contrast, system information transmitted on a PDSCH that is indicated by a PDCCH is a System Information Block (SIB).

Control information transmitted through a PDCCH is called Downlink Control Information (DCI). DCI may include the resource assignment (this is called a DL grant) of a PDSCH, the resource assignment (this is also called an UL grant) of a PUSCH, a set of transmission power control commands for each UE within a specific UE group and/or the activation of a Voice over Internet Protocol (VoIP).

In 3GPP LTE, blind decoding is used to detect a PDCCH. Blind decoding is a method of demasking a desired identifier to the CRC of a received PDCCH (this is called a candidate PDCCH) and checking whether or not the corresponding PDCCH is its own control channel by checking a CRC error.

A BS determines a PDCCH format according to DCI to be transmitted to UE, attaches a Cyclic Redundancy Check (CRC) to the DCI, and masks a unique identifier (this is called a Radio Network Temporary Identifier (RNTI)) to the CRC depending on the owner or use of a PDCCH.

A control region within a subframe includes a plurality of Control Channel Elements (CCEs). The CCE is a logical assignment unit that is used to provide a PDCCH with a coding rate according to the state of a radio channel, and the CCE corresponds to a plurality of Resource Element Groups (REGs). The REG includes a plurality of Resource Elements (REs). The format of a PDCCH and the number of bits of a possible PDCCH are determined depending on an association between the number of CCEs and a coding rate provided by the CCEs.

One REG includes 4 REs, and one CCE includes 9 REGs. In order to configure one PDCCH, {1, 2, 4, 8} CCEs may be used, and each of the {1, 2, 4, 8} CCEs is called a CCE aggregation level.

The number of CCEs used to send a PDDCH is determined by a BS based on a channel state. For example, one CCE may be used to send a PDCCH in UE having a good DL channel state. 8 CCEs may be used to send a PDCCH in UE having a poor DL channel state.

A control channel consisting of one or more CCEs is subject to interleaving of an REG unit and then mapped to physical resources after a cyclic shift based on a cell identifier (ID) is performed.

Figure 2:
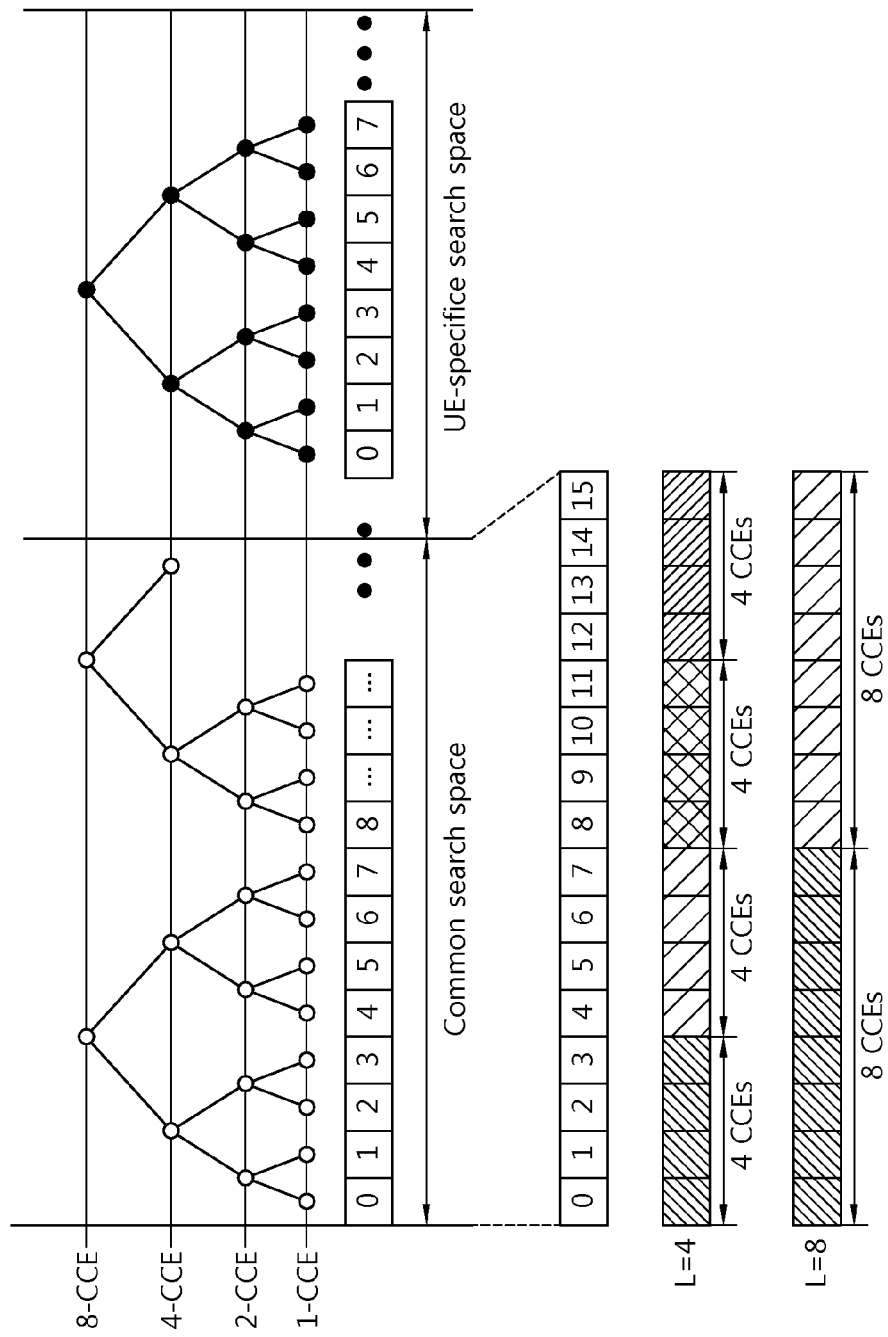
FIG. 2 is an exemplary diagram showing the monitoring of a PDCCH.

FIG. 2 is an exemplary diagram showing the monitoring of a PDCCH. For the monitoring of a PDCCH, reference can be made to Paragraph 9 of 3GPP TS 36.213 V10.2.0 (2011-06).

In LTE 3GPP, blind decoding is used to detect a PDCCH. Blind decoding is a method of demasking a desired identifier to the CRC of a received PDCCH (this is called a PDCCH candidate) and checking whether or not the corresponding PDCCH is its own control channel by checking a CRC error. UE is unaware that its own PDCCH is transmitted using what CCE aggregation level or DCI format at which placed within a control region.

A plurality of PDCCHs may be transmitted within one subframe. UE monitors a plurality of PDCCHs every subframe. Here, monitoring means that UE attempts the decoding of a PDCCH according to a monitored PDCCH format.

In 3GPP LTE, a search space is used in order to reduce overhead attributable to blind decoding. The search space may be called a monitoring set of CCEs for a PDCCH. UE monitors a PDCCH within a corresponding search space.

The search space is divided into a Common Search Space (CSS) and a UE-specific Search Space (USS). The CSS is a space in which a PDCCH having common control information is searched for. The CSS includes 16 CCEs of CCE indices 0~15 and supports a PDCCH having a CCE aggregation level of {4, 8}. However, a PDCCH (DCI formats 0 and 1A) that carries UE-specific information may also be transmitted in a CSS. The USS supports a PDCCH having a CCE aggregation level of {1, 2, 4, 8}.

The following table 1 indicates the number of PDCCH candidates that are monitored by UE.

TABLE 1

| Search Space Type | Aggregation level L | Size [In CCEs] | Number of PDCCH candidates | DCI formats |
|---|---|---|---|---|
| UE-specific | 1 | 6 | 6 | 0, 1, 1A, 1B, 1D, 2, 2A |
|  | 2 | 12 | 6 |  |
|  | 4 | 8 | 2 |  |
|  | 8 | 16 | 2 |  |
| Common | 4 | 16 | 4 | 0, 1A, 1C, 3/3A |
|  | 8 | 16 | 2 |  |

The size of a search space is determined according to Table 1, and the start point of a search space is differently determined in a CSS and a USS. The start point of a CSS is fixed irrespective of a subframe, whereas the start point of a USS may vary in each subframe depending on a UE identifier (e.g., C-RNTI), a CCE aggregation level and/or a slot number within a radio frame. If the start point of a USS is within a CSS, a USS and the CSS may overlap with each other.

In an aggregation level L∈{1,2,3,4}, a search space $S^{(L)}_k$ is defined as a set of PDCCH candidates. A CCE corresponding to a PDCCH candidate m of the search space $S^{(L)}_k$ is given as follows.

$$L \cdot \{(Y_k + m') \bmod \lfloor N_{CCE,k}/L \rfloor\} + i \quad \text{[Equation 1]}$$

In Equation 1, i=0, 1, . . . , L-1, m=0, . . . , $M^{(L)}$-1, and $N_{CCE,k}$ is a total number of CCEs that may be use to send a PDCCH within the control region of a subframe k. The control region includes a set of CCEs numbered from 0 to $N_{CCE,k}$-1. $M^{(L)}$ is the number of PDCCH candidates in a CCE aggregation level L within a given search space.

If a Carrier indicator Field (CIF) is configured for UE, $m'=m+M^{(L)}n_{cif}$. $n_{cif}$ is a value of the CIF. If a CIF is not configured for UE, m'=m.

In a CSS, $Y_k$ is 2 aggregation levels and is set to 0 in relation to L=4 and L=8.

In a USS of an aggregation level L, a parameter $Y_k$ is defined as follows.

$$Y_k = (A \cdot Y_{k-1}) \bmod D \quad \text{[Equation 2]}$$

In Equation 2, $Y_{-1}=n_{RNTI}\neq 0$, A=39827, D=65537, k=floor ($n_s/2$), and $n_s$ is a slot number within a radio frame.

In 3GPP LTE, the transmission of a DL transport block is performed in the form of a pair of a PDCCH and a PDSCH. The transmission of an UL transport block is performed in the form of a pair of a PDCCH and a PUSCH. For example, UE receives a DL transport block on a PDSCH that is indicated by a PDCCH. UE monitors a PDCCH in a downlink subframe and receives a DL grant that includes DL resource assignment on the PDCCH. UE receives a DL transport block on a PDSCH that is indicated by DL resource assignment.

Figure 3:
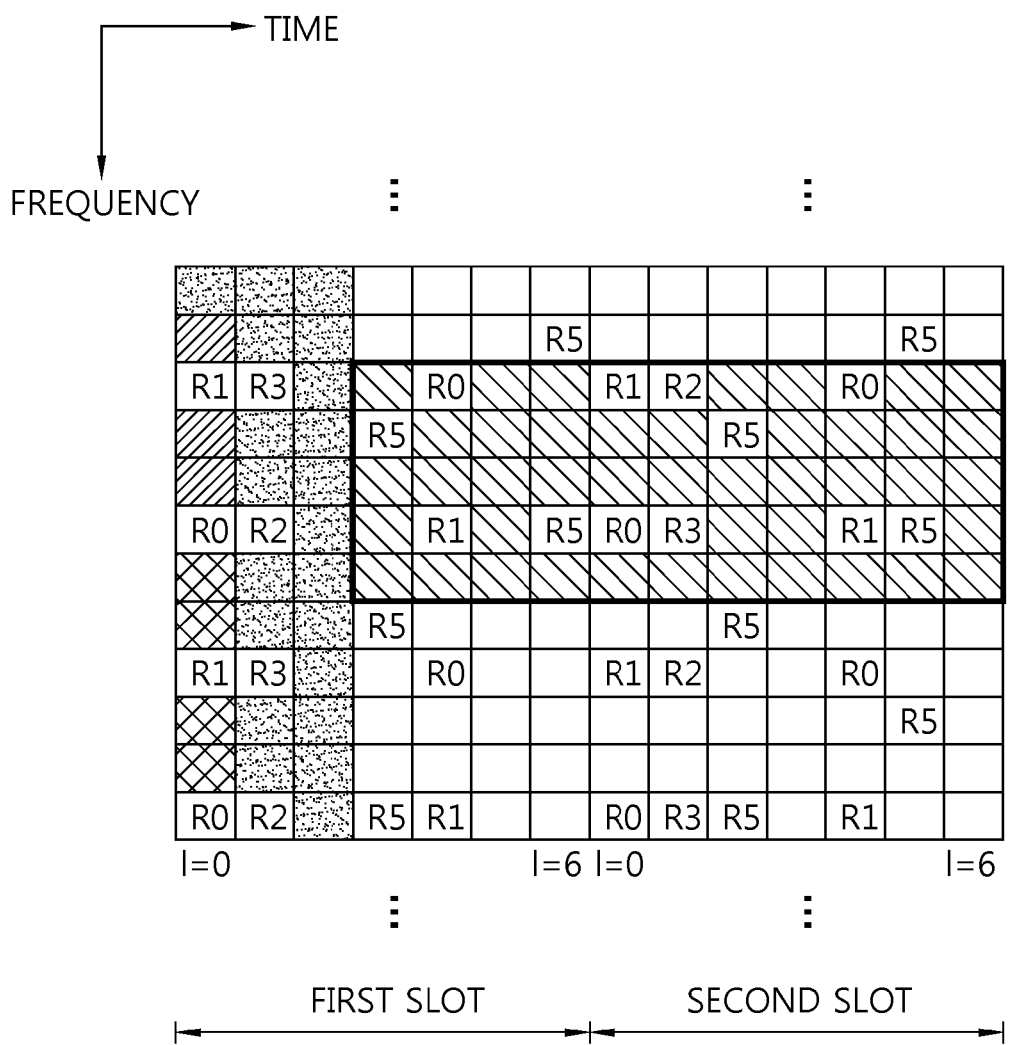
FIG. 3 shows an example of a downlink subframe in 3GPP LTE-A.

FIG. 3 shows an example of a downlink subframe in 3GPP LTE-A.

A control region includes the former 3 OFDM symbols, and a data region in which a PDSCH is transmitted includes the remaining OFDM symbols.

A PCFICH, a PHICH and/or a PDCCH are transmitted within the control region. The CIF of the PCFICH may include 3 OFDM symbols. Regions other than resources through which the PCFICH and/or the PHICH, of the control region, become PDCCH regions in which PDCCHs are monitored.

Various reference signals are also transmitted in the subframe.

A Cell-specific Reference Signal (CRS) may be received by all UEs within a cell and is transmitted over the entire DL band. In FIG. 3, 'R0' indicates a Resource Element (RE) in which a CRS for the first antenna port is transmitted, 'R1' indicates an RE in which a CRS for the second antenna port is transmitted, 'R2' is an RE in which a CRS for the third antenna port is transmitted, and 'R3' is an RE in which a CRS for the fourth antenna port is transmitted.

An RS sequence $r_{l,ns}(m)$ for a CSR is defined as follows.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{[Equation 3]}$$

In Equation 3, m=0, 1, . . . , $2N_{maxRB}-1$, $N_{maxRB}$ is a maximum number of RBs, ns is a slot number within a radio frame, and l is an OFDM symbol number within a slot.

A pseudo-random sequence c(i) is defined by the following gold sequence of length 31.

$$c(n)=_1(n+Nc)+x_2(n+Nc))\bmod 2$$

$$x_1(n+31)=(x_1(n+3)+x_1(n))\bmod 2$$

$$x_2(n+31)=_2(n+3)+x_2(n+2)+x_2(n+1)+x_2(n))\bmod 2 \quad \text{[Equation 4]}$$

In Equation 4, Nc=1600, and the first m-sequence is reset to $x_1(0)=1$, $x_1(n)=0$, m=1, 2, . . . , 30.

The second m-sequence is initialized to $c_{init}=2^{10}(7(ns+1)+l+1)(2N^{cell}_{ID}+1)+2^{cell}_{ID}+N_{CP}$ at the start of each OFDM symbol. $N^{cell}_{ID}$ is a Physical Cell Identity (PCI) of a cell and is $N_{CP}=1$ in a normal CP and $N_{CP}=0$ in an extended CP.

A UE-specific Reference Signal (URS) is transmitted in a subframe. A CRS is transmitted in the entire region of a subframe, whereas an URS is transmitted in the data region of a subframe and used to demodulate a corresponding PDSCH. In FIG. 3, 'R5' indicates an RE in which an URS is transmitted. The URS is also called a Dedicated Reference Signal (DRS) or a DeModulation Reference Signal (DM-RS).

A URS is transmitted only in an RB to which a corresponding PDSCH is mapped. R5 is indicated in FIG. 3 in addition to a region in which a PDSCH is transmitted, which is for indicating the position of an RE to which an URS is mapped.

A URS is used by only UE that receives a corresponding PDSCH. An RS sequence $r_{ns}(m)$ for a URS is the same as Equation 3. Here, m=0, 1, . . . , $12N_{PDSCH,RB}-1$, and $N_{PDSCH,RB}$ is the number of RBs for transmitting a corresponding PDSCH. A pseudo-random sequence generator is reset to $c_{init}=(\text{floor}(ns/2)+1)(2N^{cell}_{ID}+1)2^{16}+n_{RNTI}$ at the start of each subframe. $n_{RNTI}$ is UE identifier.

The above shows a case where a URS is transmitted through a single antenna. When a URS is transmitted through multiple antennas, a pseudo-random sequence generator is initialized to $c_{init}=(\text{floor}(ns/2)+1)(2N^{cell}_{ID}+1)2^{16}+n_{SCID}$ at the start of each subframe. $n_{SCID}$ is a parameter that is obtained from a DL grant (e.g., a DCI format 2B or 2C) related to the transmission of a PDSCH.

Figure 4:
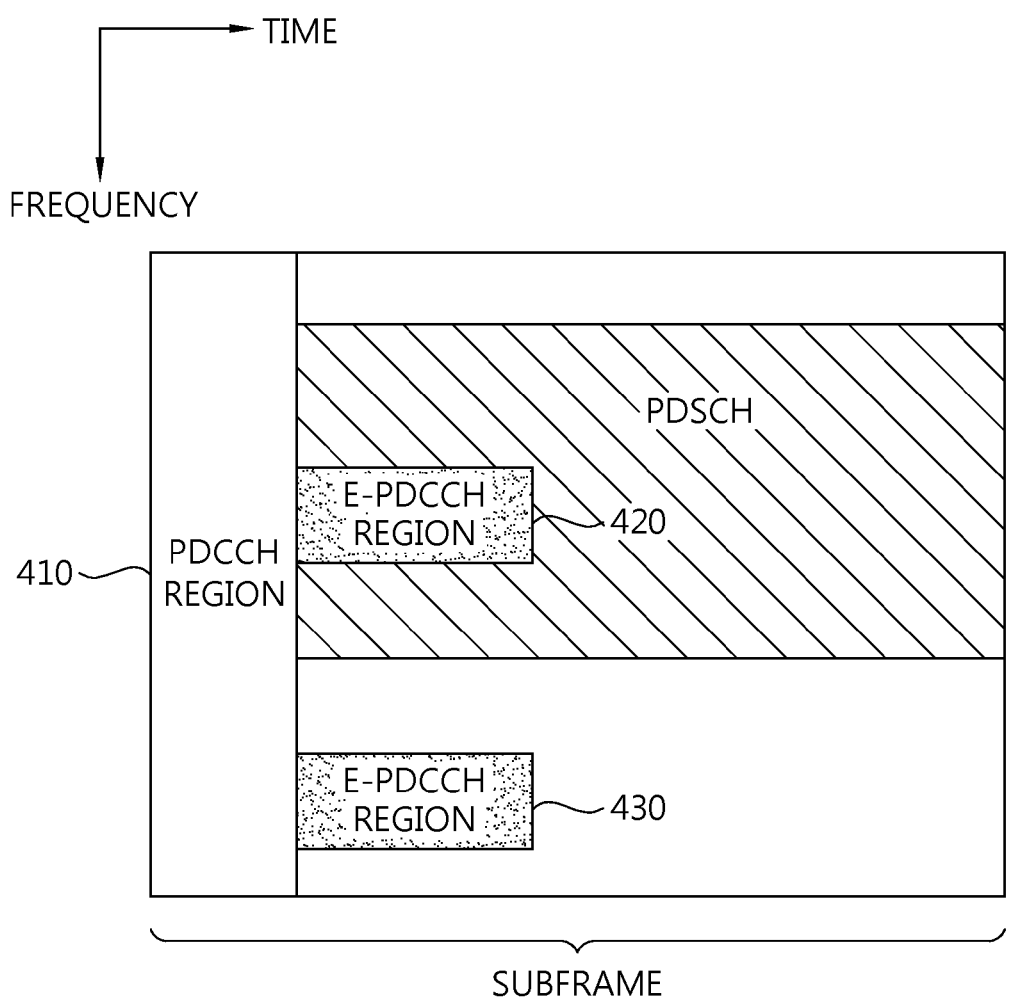
FIG. 4 is an example of a subframe having E-PDCCHs.

FIG. 4 is an example of a subframe having E-PDCCHs.

In existing 3GPP LTE/LTE-A systems, a PDCCH that carries various pieces of control information, such as DL/UL scheduling, is limitedly transmitted only in the control region of a subframe. Accordingly, the introduction of an Extended-PDCCH (E-PDCCH) that is more freely scheduled is discussed. An E-PDCCH is also called an Enhanced-PDCCH.

A subframe may include a PDCCH region 410 in which a PDCCH is monitored and one or more E-PDCCH regions 420 and 430 in which an E-PDDCH is monitored.

The PDCCH region 410 is placed within a maximum of the former 4 OFDM symbols of the subframe, whereas the E-PDCCH regions 420 and 430 may be flexibly scheduled within a data region.

In the PDCCH region 410, a PDCCH can be demodulated on the basis of a CRS. In the E-PDCCH regions 420 and 430, an E-PDCCH can be demodulated on the basis of an URS. The URS can be transmitted in the corresponding E-PDCCH regions 420 and 430.

In the E-PDCCH regions 420 and 430, an E-PDDCH can be monitored using blind decoding. Or, an E-PDCCH may not use blind decoding. UE may be aware of the position and number of E-PDCCHs within the E-PDCCH regions 420 and 430 and may detect an E-PDCCH in a designated position.

The E-PDCCH regions 420 and 430 may be monitored by one UE, a group of UEs, or UEs within a cell. If specific UE monitors the E-PDCCH regions 420 and 430, $n_{RNTI}$ or $n_{SCID}$ used to reset the pseudo-random sequence generator of an URS can be obtained based on the identifier of the specific UE. If a group of UEs monitor the E-PDCCH regions 420 and 430, $n_{RNTI}$ or $n_{SCID}$ used to reset the pseudo-random sequence generator of an URS can be obtained based on the identifier of the corresponding group of UEs.

When the E-PDCCH regions 420 and 430 are transmitted through multiple antennas, the same precoding as that of an URS can be applied to the E-PDCCH regions 420 and 430.

Figure 5:
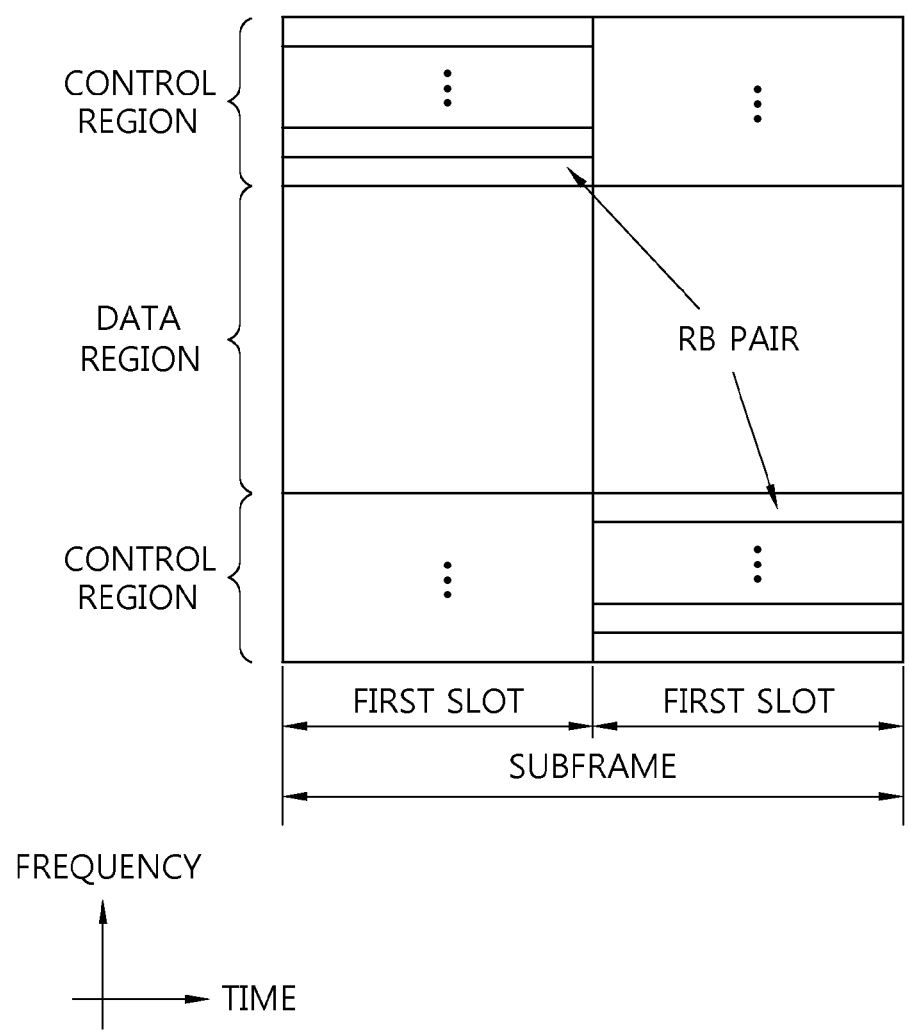
FIG. 5 shows the structure of an uplink subframe.
Figure 6:
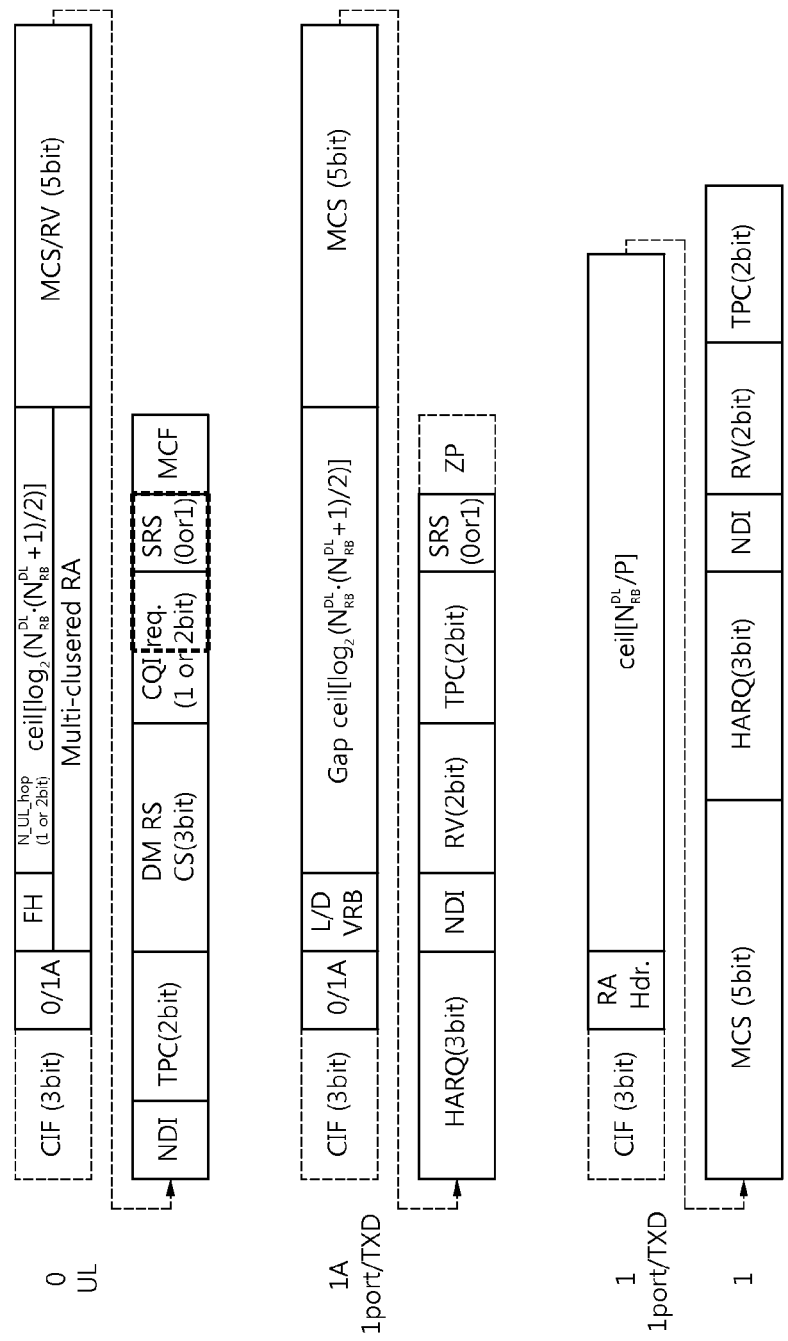
FIGS. 6 to 9 show existing DCI formats.
Figure 7:
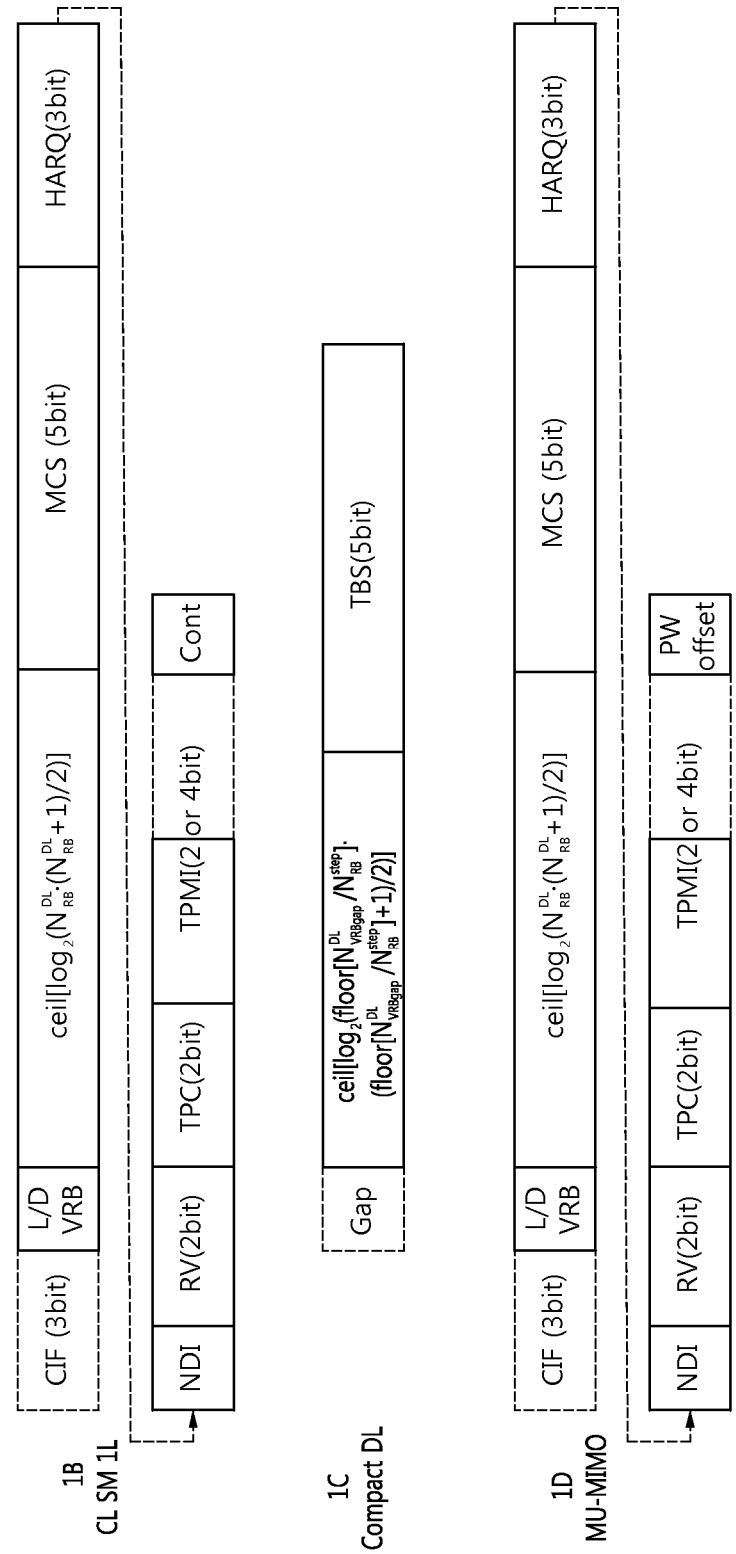
Figure 8:
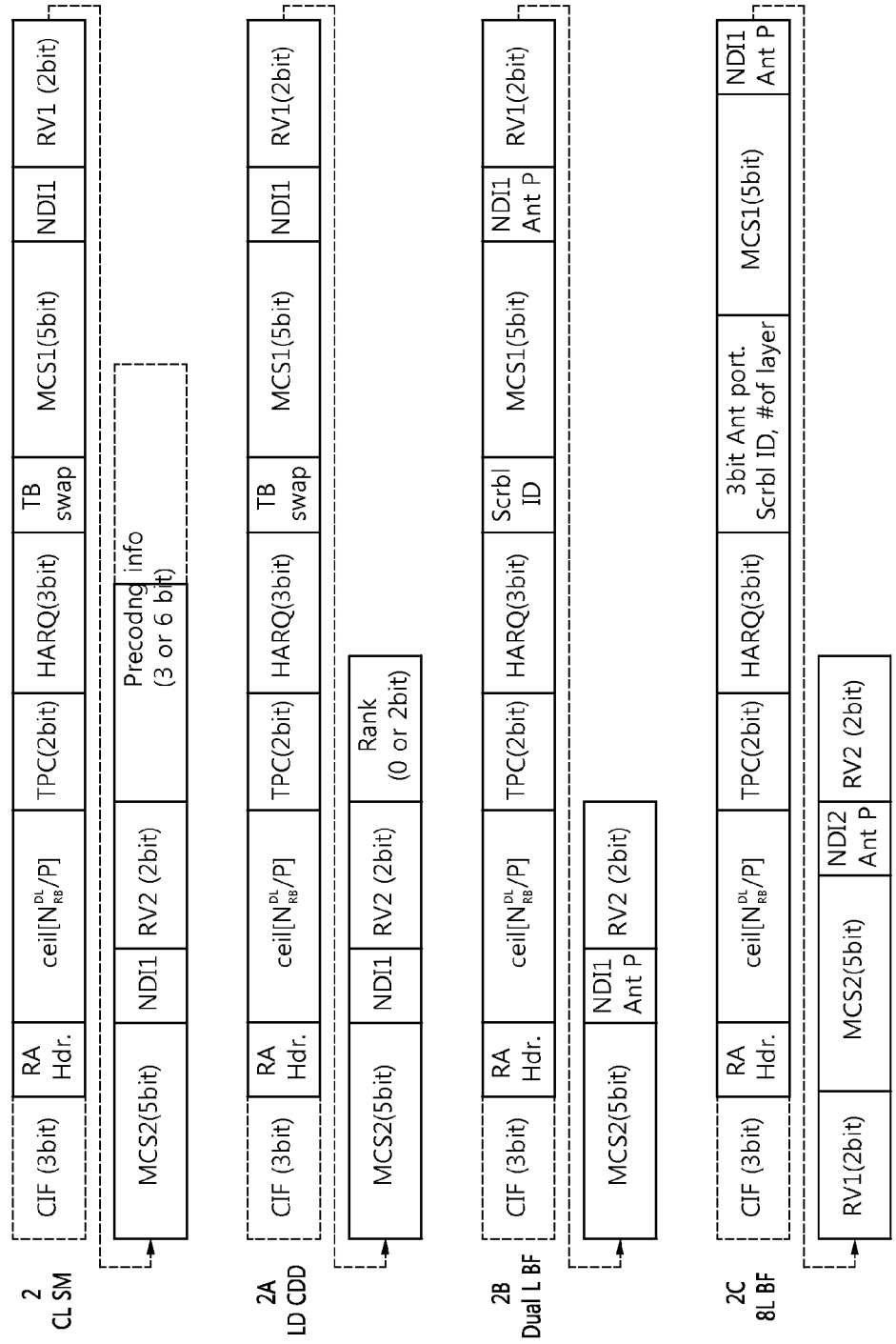
Figure 9:
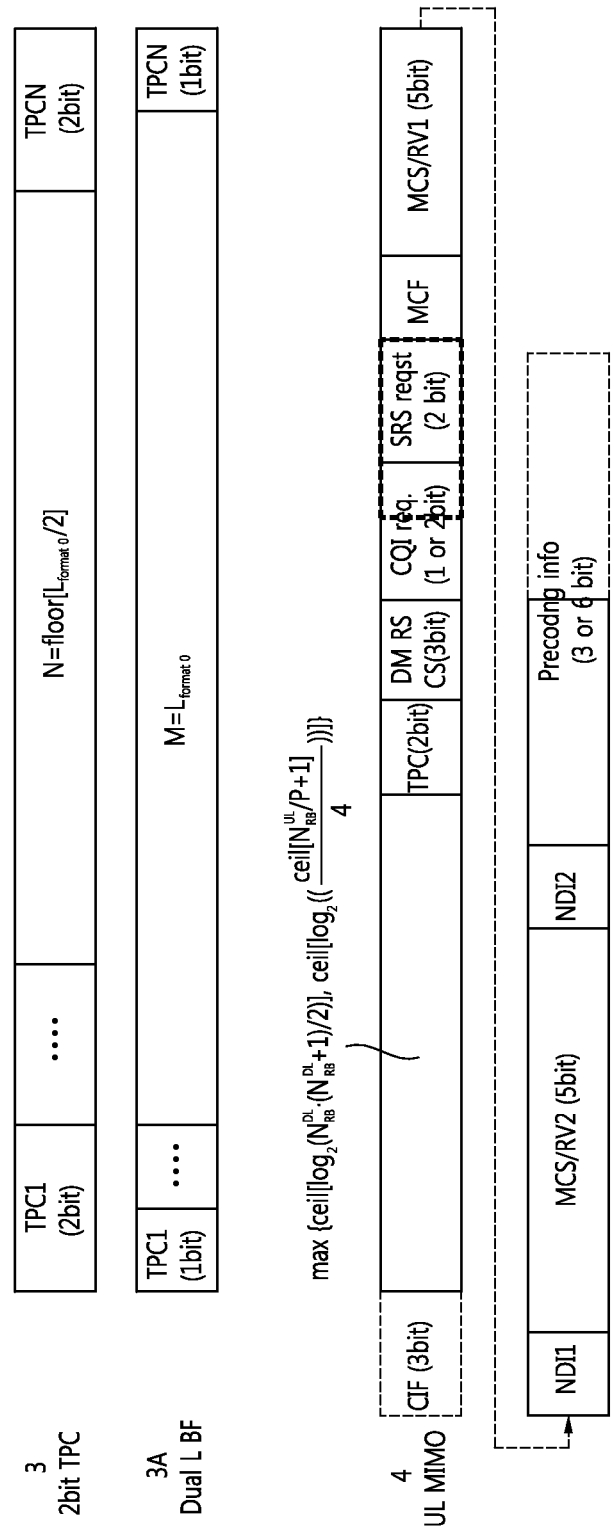

FIG. 5 shows the structure of an uplink subframe.

Referring to FIG. 5, the uplink subframe can be divided into a control region and a data region in a frequency domain. A Physical Uplink Control Channel (PUCCH) on which UL control information is transmitted is assigned to the control region. A Physical Uplink Shared Channel (PUSCH) on which data is transmitted (control information may also be transmitted according to circumstances) is assigned to the data region. UE may transmit a PUCCH and a PUSCH at the same time or may transmit any one of a PUCCH and a PUSCH depending on a configuration.

A PUCCH for one UE is assigned in the form of a Resource Block (RB) pair in the subframe. RBs that belong to the RB pair occupy different subcarriers in the first slot and the second slot. A frequency occupied by RBs that belong to the RB pair assigned to the PUCCH is changed on the basis of a slot boundary. This is said that the RB pair assigned to the PUCCH has been frequency-hopped at the slot boundary. A frequency diversity gain can be obtained by sending UL control information through different subcarriers according to the time.

Hybrid Automatic Repeat reQuest (HARQ) acknowledgement (ACK)/non-acknowledgement (NACK) and Channel Status Information (CSI) indicative of a DL channel state, for example, a Channel Quality Indicator (CQI), a Precoding Matrix Index (PMI), a Precoding Type Indicator (PTI), and a Rank Indication (RI), can be transmitted on a PUCCH. Periodic CSI may be transmitted through a PUCCH.

A PUSCH is mapped to an Uplink Shared Channel (UL-SCH) that is a transport channel. Uplink data transmitted on a PUSCH may be a transport block, that is, a data block for an UL-SCH that is transmitted during a TTI. The transport block may include user data. Or, the uplink data may be multiplexed data. The multiplexed data may have been obtained by multiplexing a transport block for an UL-SCH and CSI. For example, CSI multiplexed with data may include a CQI, a PMI, and an RI. Or, the uplink data may include only CSI. Periodic or non-periodic CSI may be transmitted through a PUSCH.

Existing DCI formats transmitted on a PDCCH are described below.

FIGS. 6 to 9 show existing DCI formats.

The DCI format includes fields to be described below, and the fields may be mapped to respective information bits $a_0$ to $a_{A-1}$. The fields may be sequentially mapped in order that is described in each DCI format, and each field may include '0' padding bits. The first field may be mapped to the information bit $a_o$, that is, the lowest degree, and other consecutive fields may be mapped to information bits having a higher degree. In each field, a Most Significant Bit (MSB) may be mapped to information bit having the lowest degree of a corresponding field. For example, the MSB bit of the first field may be mapped to $a_o$. A set of fields included in each existing DCI format is called an information field.

1. DCI Format 0

The DCI format 0 is used for the scheduling of a PUSCH. Information (field) transmitted through the DCI format 0 is as follows.

1) If an information (field) is a flag for classifying the DCI format 0 and a DCI format 1A (if the flag is 0, it indicates the DCI format 0, and if the flag is 1, it indicates the DCI format 1A), 2) a hopping flag (1 bit), 3) RB designation and hopping resource assignment, 4) a Modulation and Coding Scheme (MCS) and a redundancy version (5 bits), 5) a New Data Indicator (NDI) (1 bit), 6) a TPC command (2 bits) for a scheduled PUSCH, 7) a cyclic shift (3 bits) for a DM-RS, 8) an UL index, 9) a DL designation index (only in TDD), 10) a CQI request, etc. If the number of information bits in the DCI format 0 is smaller than the payload size of the DCI format 1A, '0' is padded so that the payload size becomes equal to that of the DCI format 1A.

2. DCI Format 1

The DCI format 1 is used for the scheduling of one PDSCH codeword. The following pieces of information are transmitted in the DCI format 1.

1) If a resource assignment header (indicates resource assignment type 0/type 1)-DL bandwidth is smaller than 10 PRBs, the resource assignment header is not included, and it is assumed to be the resource assignment type 0. 2) RB designation, 3) an MCS, 4) an HARQ process number, 5) an NDI, 6) a redundancy version, 7) a TPC command for a PUCCH, 8) a DL designation index (only in TDD), etc. If the number of information bits of the DCI format 1 is the same as that of the DCI formats 0/1A, one bit having a '0' value is added to the DCI format 1. If the number of information bits in the DCI format 1 is equal to any one of {12, 14, 16, 20, 24, 26, 32, 40, 44, 56}, a bit having one or more '0' values is added to the DCI format 1 so that the DCI format 1 has {12, 14, 16, 20, 24, 26, 32, 40, 44, 56} and a different payload size from the DCI formats 0/1A.

3. DCI Format 1A

The DCI format 1A is used for the compact scheduling of one PDSCH codeword or a random access process.

The following pieces of information are transmitted in the DCI format 1A. 1) A flag for classifying the DCI format 0 and the DCI format 1A, 2) A localization/distribution VRB designation flag, 3) RB designation, 4) an MCS, 5) an HARQ process number, 6) an NDI, 7) a redundancy version, 8) a TPC command for a PUCCH, 9) a DL designation index (only in TDD), etc. If the number of information bits of the DCI format 1A is smaller than the number of information bits of the DCI format 0, bits having a '0' value is added so that the DCI format 1A has the same payload size as the DCI format 0. If the number of information bits in the DCI format 1A is equal to any one of {12, 14, 16, 20, 24, 26, 32, 40, 44, 56}, a bit having one '0' value is added to the DCI format 1A.

4. DCI Format 1B

The DCI format 1B includes precoding information, and it is used for the compact scheduling of one PDSCH codeword. The following pieces of information are transmitted in the DCI format 1B.

1) A localization/distribution VRB designation flag, 2) RB designation, 3) an MCS, 4) HARQ process number, 5) an NDI, 6) a redundancy version, 7) a redundancy version for a PUCCH, 8) a DL designation index (only in TDD), 9) Transmitted Precoding Matrix Indicator (TPMI) information for precoding, 10) a PMI check for precoding, etc. If the number of information bits in the DCI format 1B is equal to any one of {12, 14, 16, 20, 24, 26, 32, 40, 44, 56}, a bit having one '0' value is added to the DCI format 1B.

5. DCI Format 1C

The DCI format 1C is used for the very compact scheduling of one PDSCH codeword. The following pieces of information are transmitted in the DCI format 1C.

1) An indicator indicative of a gap value, 2) RB designation, 3) a Transport Block Size (TBS) index, etc.

6. DCI Format 1D

The DCI format 1D includes precoding and power offset information, and it is used for the compact scheduling of one PDSCH codeword.

The following pieces of information are transmitted in the DCI format 1D.

1) A localization/distribution VRB designation flag, 2) RB designation, 3) an MCS, 4) HARQ process number, 5) a New Data Indicator (NDI), 6) a redundancy version, 7) a TPC command for a PUCCH, 8) a DL designation index (only in TDD), 9) TPMI information for precoding, 10) a DL power offset, etc. If the number of information bits in the DCI format 1D is equal to any one of {12, 14, 16, 20, 24, 26, 32, 40, 44, 56}, a bit having one '0' value is added to the DCI format 1D.

7. DCI Format 2

The DCI format 2 is used for PDSCH designation for a closed-loop MIMO operation. The following pieces of information are transmitted in the DCI format 2D.

1) A resource assignment header, 2) RB designation, 3) a TPC command for a PUCCH, 4) a DL designation index (only in TDD), 5) an HARQ process number, 6) a transport block to a codeword swap flag, 7) an MCS, 8) an NDI, 9) a redundancy version, 10) precoding information, etc.

8. DCI Format 2A

The DCI format 2A is used for PDSCH designation for an open-loop MIMO operation. The following pieces of information are transmitted in the DCI format 2A.

1) A resource assignment header, 2) a TPC command for a PUCCH, 3) a DL designation flag (only in TDD), 4) an HARQ process number, 5) a transport block to codeword swap flag, 6) an MCS, 7) an NDI, 8) a redundancy version, 9) precoding information, etc.

9. DCI Format 2B

The DCI format 2B is used for dual layer beamforming.

1) A resource assignment header, 2) RB assignment, 3) a TPC command for a PUCCH, 4) an HARQ process number, 5) a scrambling ID, 6) an MCS, 7) an NDI, 8) a Redundancy Version (RV), etc. may be included.

10. DCI Format 2C

The DCI format 2C is used for 8 layer beamforming.

1) A resource assignment header, 2) RB assignment, 3) a TPC command for a PUCCH, 4) an HARQ process number, 5) a scrambling ID, 6) an MCS, 7) an NDI, 8) a redundancy version, etc. may be included.

11. The DCI Format 3

The DCI format 3 is used to send a TPC command for a PUCCH and PUSCH through power coordination of 2 bits. The following information is transmitted in the DCI format 3.

1) N Transmit Power Control (TPC) commands Here, N is determined as in Equation 1 below.

$$N = \left\lfloor \frac{L_{format\ 0}}{2} \right\rfloor \quad \text{[Equation 5]}$$

In Equation 5, $L_{format0}$ is the same as the payload size of the DCI format 0 prior to the attachment of a CRC. If the floor $L_{format0/2}$ is smaller than ($L_{format0}/2$), one bit having a '0' value is added.

12. DCI Format 3A

The DCI format 3A is used to send a TPC command for a PUCCH and PUSCH through power coordination of 1 bit. The following information is transmitted in the DCI format 3A.

1) M TPC commands Here, M=$L_{format0}$, and $L_{format0}$ is the same as the payload size of the DCI format 0 prior to the attachment of a CRC.

13. DCI Format 4

The DCI format 4 is used for UL MIMO.

1) RB assignment, 2) a TPC command for a scheduled PUSCH, 3) a cyclic shift and Orthogonal Cover Code (OCC) index for a DM-RS, 4) an UL index, 5) a DL assignment index, 6) a CSI request, 7) an SRS request, 8) a resource assignment type, 9) precoding information may be included.

In all the transmission modes, the DCI formats 0 and 1A are basically used for UL/DL scheduling to UE, and the DCI formats 1, 1B, 1D, 2, 2A, 2B, 2C, etc. may be additionally used for DL scheduling depending on a transmission mode. The DCI format 4 may be additionally used for UL MIMO. Furthermore, a Carrier Indication Field (CIF) of 3 bits may be added to the DCI formats 0, 1, 1A, 1B, 1D, 2, 2A, 2B, 2C, and 4 depending on whether or not cross carrier scheduling has been performed.

In 3GPP LTE-A, UE may be served by a plurality of serving cells. The serving cells may be divided into a primary cell and a secondary cell. The primary cell is a cell that operates in a primary frequency and performs an initial connection establishment process with UE or initiates a connection reestablishment process and that is designated as a primary cell in a handover process. The primary cell is also called a reference cell. The secondary cell operates in a secondary frequency and may be configured after a Radio Resource Control (RRC) connection is established and may be used to provide additional radio resources. At least one primary cell is always configured, and the secondary cell may be added/modified/released by higher layer signaling (e.g., an RRC message).

The Cell Index (CI) of a primary cell may be fixed. For example, the lowest CI may be designated as the CI of a primary cell. A CIF is a field indicative of the CI of such a cell.

For a description of the DCI formats, reference may be made to Paragraph 5.3.3.1 of 3GPP TS 36.212 V8.7.0 (2009-05).

Figure 10:
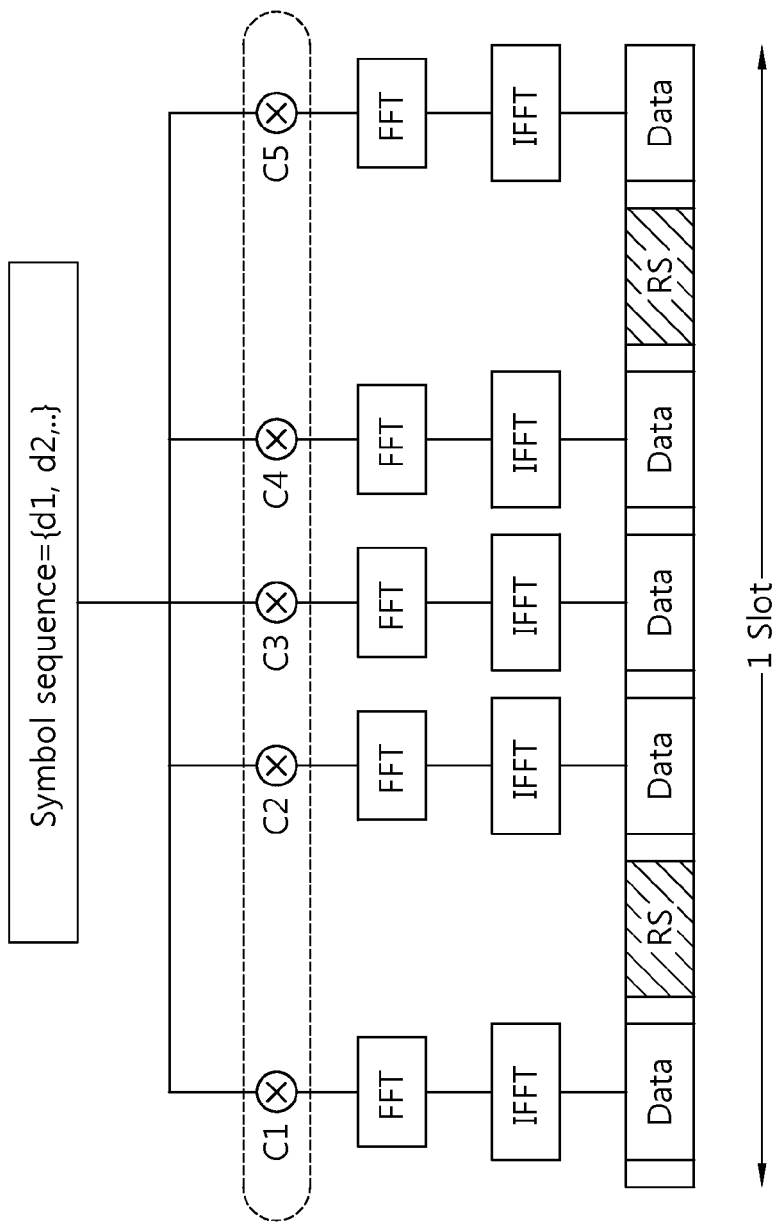
FIG. 10 shows a PUCCH format 3.

FIG. 10 shows a PUCCH format 3.

The PUCCH format 3 is a PUCCH format which uses a block spreading scheme. The block spreading scheme means a method of multiplexing a modulation symbol sequence modulated from multi-bit ACK/NACK using block spreading code. The block spreading scheme may use an SC-FDMA method. Here, the SC-FDMA method means a transmission method of performing IFFT after DFT spreading.

In the PUCCH format 3, a symbol sequence is spread in a time domain by means of block spreading code and transmitted. That is, in the PUCCH format 3, a symbol sequence including one or more symbols is transmitted in the frequency domain of each data symbol, spread in the time domain by means of block spreading code, and transmitted. Orthogonal cover code may be used as the block spreading code. FIG. 10 illustrates a case where 2 RS symbols are included in one slot, but is not limited thereto. 3 RS symbols may be included in one slot.

The present invention is described below.

In the next-generation wireless communication system, such as LTE-A, low-priced/low-specification devices which chiefly perform data communication, such as the metering of a meter, the measurement of a water level, the utilization of a surveillance camera, and a report on the inventory of a vending machine, can be supported. Such a device is called a Machine Type Communication (MTC) UE, for convenience sake.

In the case of MTC UE, the amount of data transmitted by each UE is small, whereas the number of UEs that need to be supported by one BS is many. Accordingly, to perform signaling for UL/DL scheduling every subframe in order to send UL/DL data/control information to each UE will be a great overhead for a BS. Furthermore, radio resource use efficiency will be low. That is, what a BS sends a DL grant and an UL grant for scheduling data channels to many UEs, respectively, and assigns DL data channels and UL data channels according to the DL grant and the UL grant in the state in which the amount of data to be transmitted to the UEs or the amount of data transmitted from each UE to the BS is very small is problematic in that radio resource use efficiency is low because a ratio of the amount of transmission control information to the amount of transmission data is high.

In order to solve this problem, the present invention discloses a data transmission method using a control channel between a BS and MTC UE which transmit and receive a small amount of data.

Hereinafter, a control channel means a channel through which control information for scheduling UL/DL data channels (PUSCH/PDSCH) is transmitted. The control channel includes the aforementioned PDCCH (or E-PDCCH). In a conventional PDCCH, only a DCI format including scheduling information, that is, only a control DCI format was used. The control DCI format includes the aforementioned DCI formats 0, 1, 1A/1B/1C/1D, 2/2A/2B/2C, 3/3A, 4, etc. In the present invention, a new DCI format including a transport block or higher layer (L2/L3) control information, that is, a data DCI format can be used.

The data DCI format is a DCI format including data that will be transmitted from a BS to UE, unlike the existing control DCI format including scheduling information. For example, the data DCI format may include a data field including data that is transmitted from a BS to UE, a Transmit Power Control (TPC) field used when ACK for the data is transmitted, a CRC field masked as a UE-specific ID, etc. However, fields that may be added to the data DCI format are not limited thereto, and added fields are described in detail in the following embodiments.

The data DCI format can be distinguished from the control DCI format using at least one of the following methods.

1) Distinguishment Through a UE-Specific ID

A BS may add a CRC to a data DCI format and a control DCI format and send the data DCI format and the control DCI format. A UE-specific ID masked to a CRC can be classified and used. That is, a UE-specific ID used in the data DCI format and a UE-specific ID used in the control DCI format can be classified and used. UE may detect a DCI format not including an error by demasking the CRC of the DCI format using the UE-specific ID and determine whether the DCI format is a data DCI format or a control DCI format depending on what UE-specific ID is used.

2) Distinguishment Through a DCI Format Length

A BS may mask the same UE-specific ID to a data DCI format and a control DCI format, but may differently set the lengths of the data DCI format and the control DCI format, that is, total bit sizes. For example, N1 bits or N2 bits may be agreed in advance as the bit sizes of a data DCI format, and N3 bits or N4 bits may be agreed in advance as the bit sizes of a control DCI format. UE may determine whether a DCI format is a data DCI format or a control DCI format based on the length of the DCI format detected through blind decoding.

For example, the DCI formats 0/1A are basic DCI formats which are used irrespective of a Transmission Mode (TM) and are also transmitted as CSSs. The DCI formats 0/1A may be used as control DCI formats, and a DCI format additionally configured depending on a transmission mode may be used as a data DCI format.

3) Distinguishment Through an Indicator Included in a DCI Format

A BS may mask a CRC to a data DCI format and a control DCI format using the same length (bit size) and the same UE-specific ID, but transmit the data DCI format and the control DCI format including a 1-bit indicator. In such a case, UE may determine whether a DCI format is a data DCI format or a control DCI format depending on whether a value of the indicator is '0' or '1'.

4) Distinguishment Through a Subframe

A BS may limit the transmission of a data DCI format to a specific subframe. Here, in order to reduce the number of times of blind decoding by UE in order to detect the data DCI format, the transmission of some of or the entire control DCI format in a corresponding subframe may be limited. The specific subframe may be configured in advance through a higher layer signal, such as an RRC message.

5) Distinguishment Through a Search Space

A BS may classify search spaces and transmit a data DCI format and a control DCI format. UE attempts to detect a data DCI format and a control DCI format for each search space.

A search space in which a data DCI format may be transmitted is described below.

Figure 11:
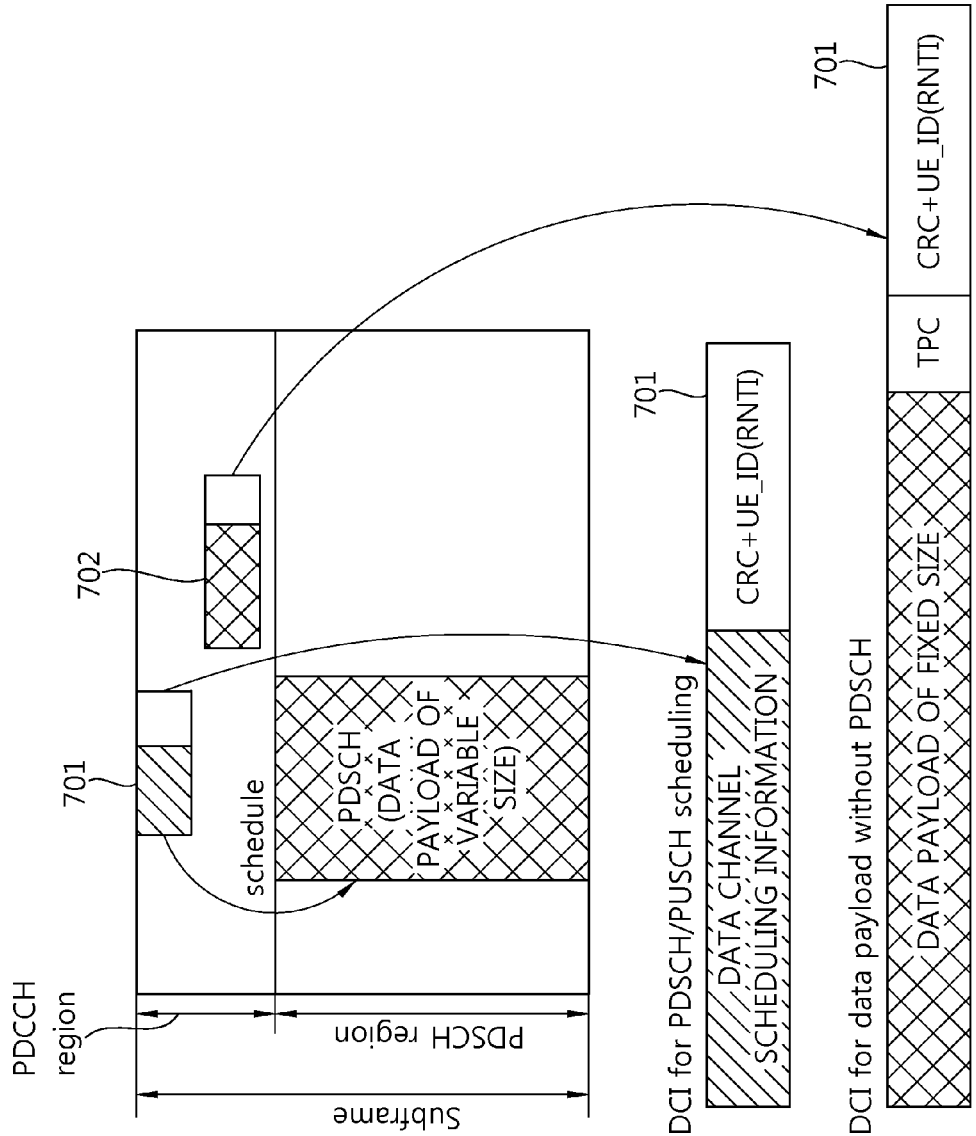
FIG. 11 shows a first example in which the search space of a data DCI format and a control DCI format is configured.

FIG. 11 shows a first example in which the search space of a data DCI format and a control DCI format is configured.

Referring to FIG. 11, a control DCI format 701 and a data DCI format 702 are transmitted within a PDCCH region. That is, a search space for detecting the control DCI format 701 and the data DCI format 702 is present within the PDCCH region. In such a case, UE may attempt to detect the DCI formats only within the PDCCH region through blind decoding.

Figure 12:
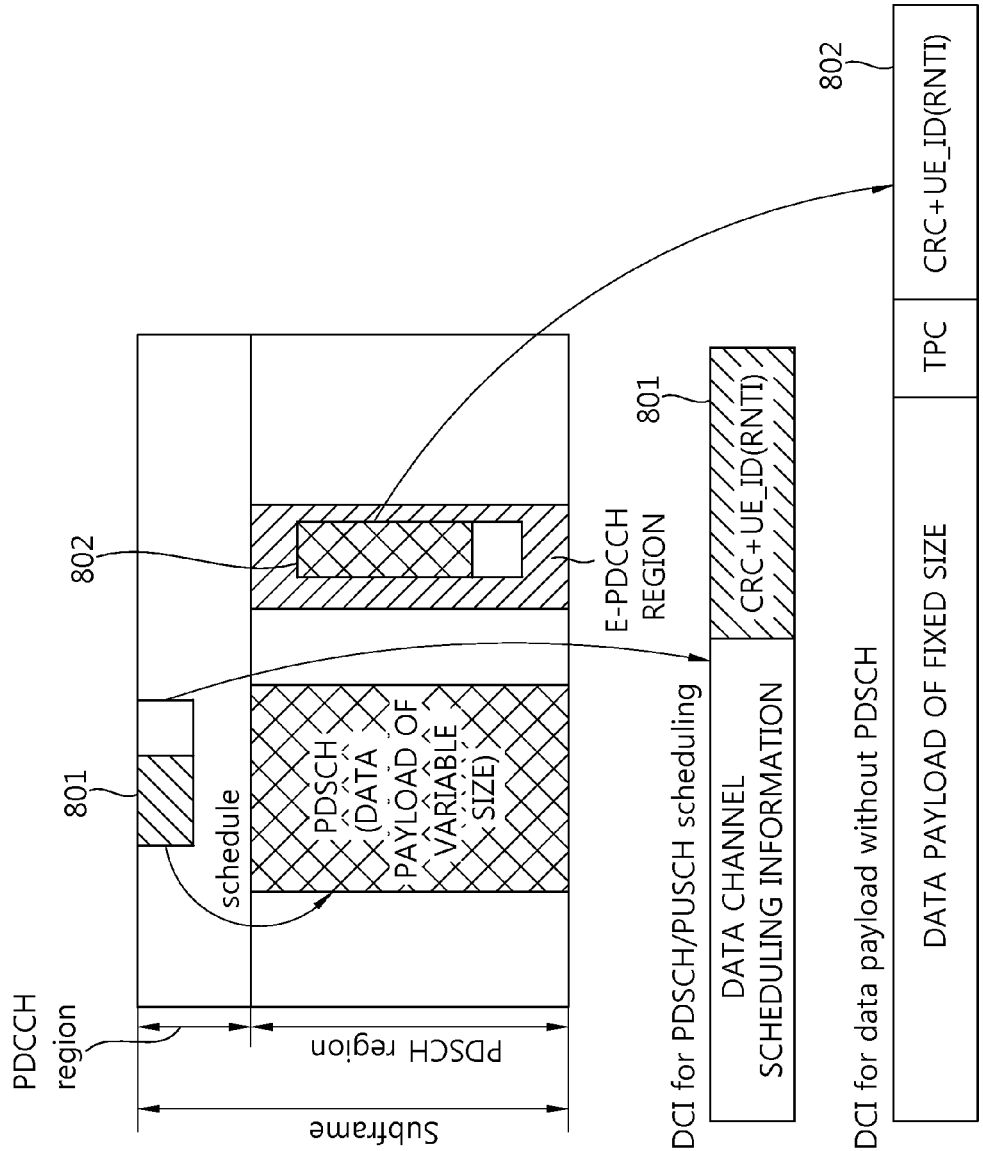
FIG. 12 shows a second example in which the search spaces of a data DCI format and a control DCI format are configured.

FIG. 12 shows a second example in which the search spaces of a data DCI format and a control DCI format is configured.

Referring to FIG. 12, a control DCI format 801 is transmitted within a PDCCH region, and a data DCI format 802 is transmitted within an E-PDCCH region. That is, a search space for detecting the control DCI format 801 and a search space for detecting the data DCI format 802 may be classified in a time domain. Reference signals used by UE in order to decode the respective DCI formats may be different.

Figure 13:
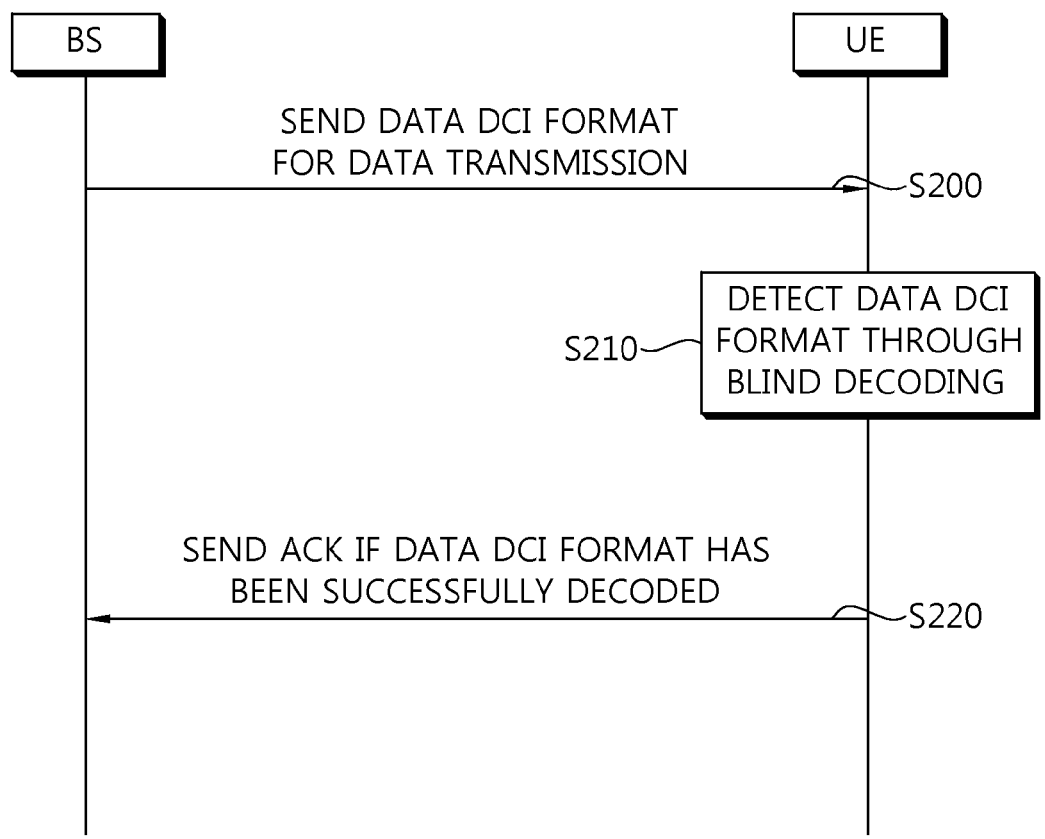
FIG. 13 shows a data transmission method using a control channel in accordance with an embodiment of the present invention.

FIG. 13 shows a data transmission method using a control channel in accordance with an embodiment of the present invention.

Referring to FIG. 13, a BS sends a data DCI format for data transmission (S200). The data DCI format may be transmitted within a PDCCH region or an E-PDCCH region.

UE detects a data DCI format through blind decoding (S210).

That is, the UE may detect the data DCI format using any one method of 1) the distinguishment through a UE-specific ID, 2) the distinguishment through a DCI format length, 3) the distinguishment through an indicator included in a DCI format, 4) the distinguishment through a subframe, and 5) the distinguishment through a search space or a combination of the methods.

For example, the data DCI format may have a previously agreed bit size, and a search space for detecting the data DCI format may be configured. The UE performs blind decoding in a search space. Here, the UE may detect a DCI including a UE-specific ID (e.g., RNTI) that has been assigned thereto.

If the data DCI format has been successfully decoded, the UE sends ACK (S220). The data DCI format may include a TPC field. The UE may control the transmission power of an UL control channel through which the ACK will be transmitted depending on a value of the TPC field and send the ACK. Furthermore, the data DCI format may include an ACK/NACK Resource Indicator (ARI) field. The UE may select the resources of an UL control channel through which the ACK will be transmitted depending on a value of the ARI field and send the ACK.

The data DCI format is detected through blind decoding. A case where a CRC check may not pass will occur. In such a case, the UE is unaware whether or not the data DCI format has been transmitted thereto. Accordingly, unlike data received through a PDSCH that has been scheduled through a control DCI format, a Hybrid Automatic Repeat Request (HARQ) combination may not be used in data that is included in a data DCI format. The HARQ combination means that first data is decoded using both the first data second data that is retransmitted when the reception of the first data fails. If data included in the data DCI format has been successfully decoded, the UE may send the ACK in order to inform the BS that the data included in the data DCI format has been successfully received/decoded.

Meanwhile, although the HARQ combination is not used, a plurality of transmission processes may be configured in order to utilize a standby time between ACK (or discontinuous transmission (DTX)) responses after data transmission. That is, if the BS sends the first data in a subframe #n and receives ACK for the first data in a subframe #n+k, the BS may configure a process of sending other data using a standby time from the subframe #n+1 to #n+k−1.

If data transmission and ACK transmission for the data are a non-periodic asynchronization operation, a field that directly informs a process number may be added to the data DCI format, or the process number may be associated with a CCE index, a CCE aggregation level, or a DM-RS port number so that the UE is indirectly aware of the process number.

If data transmission and ACK transmission for the data are a periodic synchronization operation, a process number may be associated with a subframe. For example, the repetition of a process having the same process number in a cycle of 8 subframes may be associated with a subframe.

Meanwhile, if the UE has sent the ACK and the BS has received the ACK, but recognizes the ACK as DTX, the BS may repeatedly transmit the same data to the UE. If the UE receives the same data in the state in which the UE is unaware that the same data is retransmitted, the UE may not process the retransmitted data in an L1/L2 layer and needs to process the retransmitted data in an a Radio Link Control (RLC) layer. In order to solve the problem, in the present invention, a BS may include a New Data Indicator (NDI)

field of N bits (N is a natural number of 2 or more) in a data DCI format and send the data DCI format.

Figure 14:
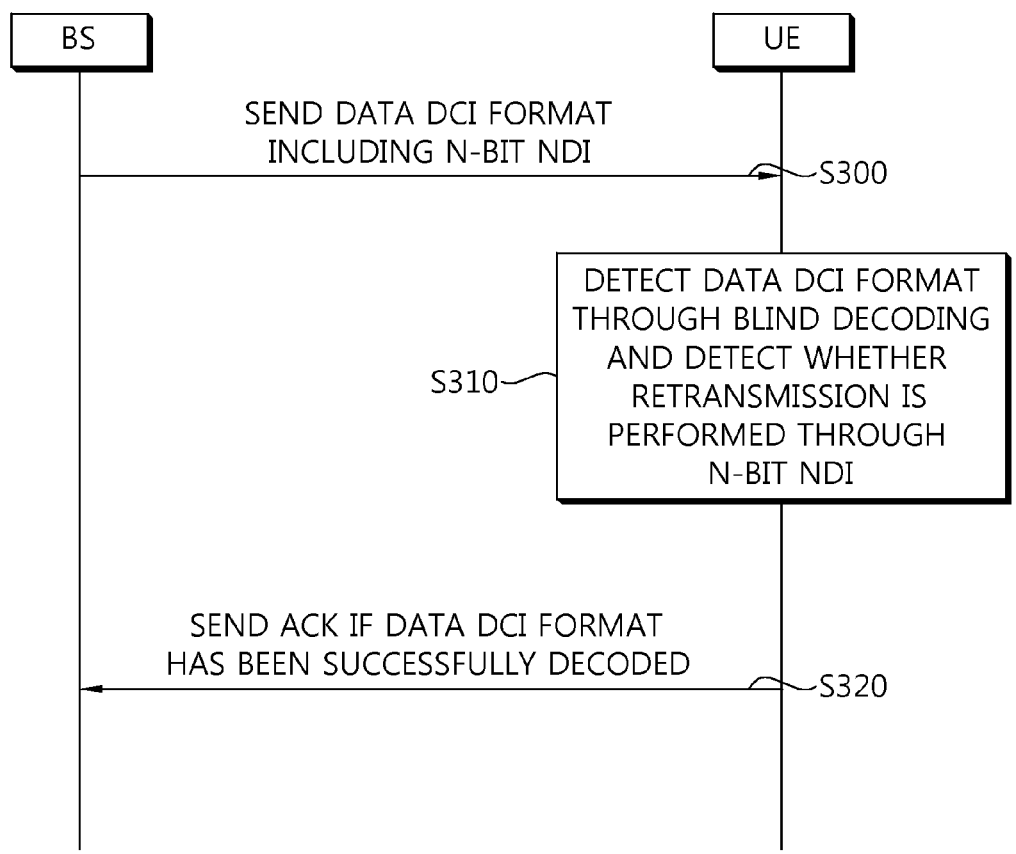
FIG. 14 shows an example in which an N-bit NDI is included in a data DCI format and transmitted.

FIG. 14 shows an example in which an N-bit NDI is included in a data DCI format and transmitted.

Referring to FIG. 14, a BS sends a data DCI format including an N-bit NDI (S300).

UE detects the data DCI format through blind decoding and detects whether or not data is retransmission data through the N-bit NDI field (S310).

An existing NDI field included in a control DCI format consists of 1 bit, and UE is informed whether data is retransmission data or new data transmission depending on whether an NDI value has been toggled or not. For example, if NDI=0 when first data is transmitted and NDI=0 when second data is transmitted, the second data informs that the first data is retransmitted because an NDI value has not been toggled. If NDI=1, the second data informs that new data not the first data is transmitted because an NDI value has been toggled.

It is assumed that first data, second data, and third data are transmitted and NDI values for the first data, the second data, and the third data are sequentially 0, 1, and 0, respectively. In such a case, the NDI values mean that the first data, the second data, and the third data are new data. It is assumed that UE has not received an NDI=1 value for the second data. In this case, the UE receives 0 and 0 as the NDI values for the first data and the third data. Accordingly, the UE may misunderstand the third data as the retransmission data of the first data because an NDI value has not been toggled.

In order to prevent the occurrence of such a problem, in the present invention, an NDI field may not consist of 1 bit, but may consist of N bits (N is a natural number of 2 or more). The N-bit NDI field can inform whether or not data is retransmission data and also indicate the number of data retransmitted. For example, in an NDI field of 2 bits, '00' may indicate new data transmission, '01' may indicate first retransmission, '10' may indicate second retransmission, and '11' may indicate third retransmission. In the case of fourth retransmission, '01' is used instead of '00'. That is, when data is retransmitted, the remaining state values other than the NDI state value '00' indicative of new transmission are used. In accordance with such a method, UE may correctly recognize the third data as new data because an NDI for the third data will be '00' in the aforementioned example in which an error has occurred.

The UE sends ACK if the data DCI format has been successfully decoded (S320).

In the methods described with reference to FIGS. 11 to 14, UE may perform blind decoding on the control DCI format earlier than the data DCI format. If the UE has been assigned a PDSCH by detecting the control DCI format, the UE may no longer need to perform blind decoding on a data DCI format in a corresponding subframe because the UE can receive data through the PDSCH.

In the present invention, a process of including data in a DCI format that is transmitted through a control channel, such as a PDCCH region or an E-PDCCH region, and sending the DCI format as described above has been described.

A method of transmitting and receiving data between MTC UE and a BS using a data channel is described below.

Figure 15:
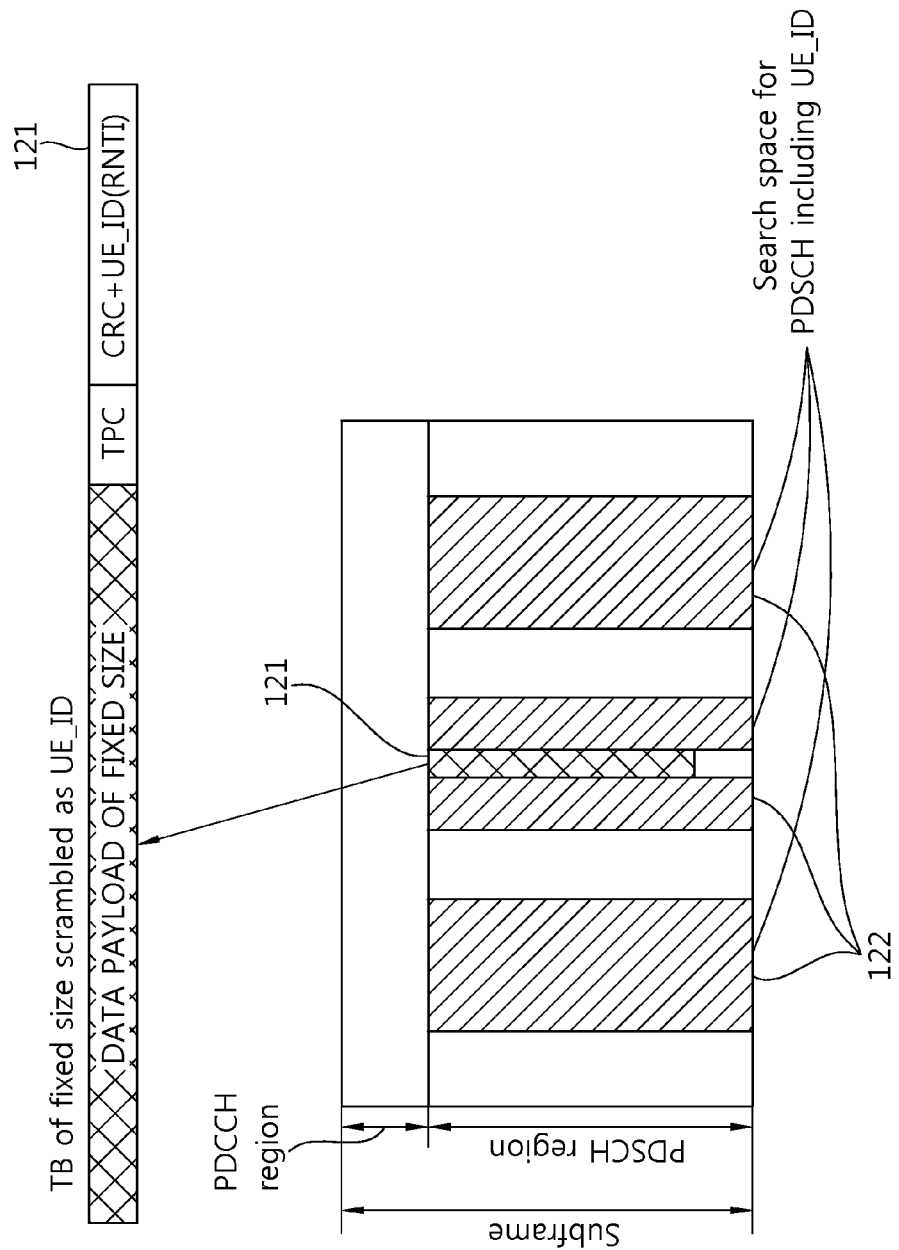
FIG. 15 shows an example of the structure of a subframe which may be used to transmit and receive data between a BS and an MTC device.

FIG. 15 shows an example of the structure of a subframe which may be used to transmit and receive data between a BS and MTC UE.

Referring to FIG. 15, a BS may configure search spaces 122 in a previously agreed PDSCH region and send a PDSCH (more particularly, a transport block) including a UE-specific ID. The search spaces 122 may be configured in accordance with a predetermined equation or based on broadcasted system information. Or the search spaces 122 may be configured through L1/L2/L3 signaling.

UE attempts blind decoding in order to detect a transport block 121 having a previously agreed length in the configured search spaces 122.

The size (i.e., bit size) of the transport block 121 may be selected from predetermined M candidate groups. This is for preventing an increase in the number of times of blind decoding by UE. Referring to Table 1, conventional UE has sequentially performed blind decoding on one DCI format in a USS 6 times, 6 times, 2 times, and 2 times, that is, a total of 16 times according to the CCE aggregation levels 1, 2, 4, and 8 (CCEs) of a PDCCH. If the size of the transport block 121 is increased (i.e., the size of a data DCI format is increased), the number of candidates in which the transport block 121 may be placed within the search space is reduced. Accordingly, the number of times of blind decoding by UE can be reduced.

In a conventional method, a BS has assigned a PDSCH to UE through scheduling information, and the UE has received data through the assigned PDSCH. In the present invention, however, UE detects data through blind decoding within a previously designated PDSCH region. Such a method can be applied to MTC UE. If MTC UE and existing UE coexist within a cell, a BS may inform that data will be received through blind decoding in which section through RRC signaling or system information.

In the case of UL, a BS assigns dedicated UL resources, classified in a time axis, a frequency axis, a space axis, or a code axis, to UE. For example, in a subframe having a specific cycle, resources classified in the frequency/space/code axes may be dedicated and assigned to UE. In an LTE-A system, the PUCCH format 3 and a PUSCH may become dedicated UL resources.

UE sends data having a fixed size only when UL data needs to be transmitted in dedicated UL resources assigned thereto. Since dedicated UL resources can be assigned to a plurality of UEs, each UE can send uplink data including a UE-specific ID of the corresponding UE. For example, a UE-specific ID may be masked to a CRC included in uplink data and transmitted.

A BS can detect the uplink data of each UE in the dedicated UL resources through blind decoding.

Figure 16:
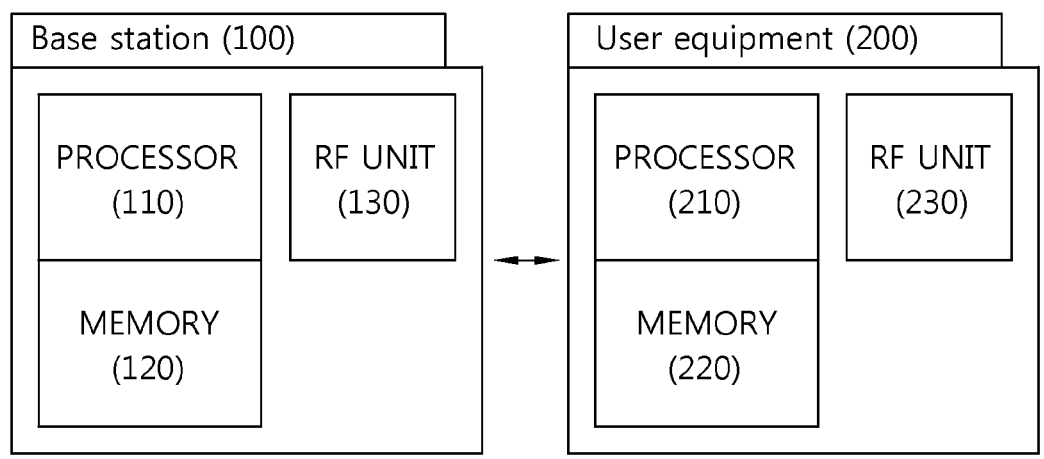
FIG. 16 shows the construction of a BS and UE in accordance with an embodiment of the present invention.

FIG. 16 shows the construction of a BS and UE in accordance with an embodiment of the present invention.

The BS 100 includes a processor 110, memory 120, and a Radio Frequency (RF) unit 130. The processor 110 implements the proposed functions, processes and/or methods. For example, the processor 110 can configure a frame including a PDCCH region, an E-PDCCH region, and a PDSCH region and send a data DCI format within the PDCCH region or the E-PDCCH region. As described above, the data DCI format can be distinguished based on an existing control DCI format and length, a masked UE-specific ID, or a 1-bit indicator. The data DCI format includes an NDI field of 2 bits or more and may inform whether the data DCI format is new transmission or somethingth retransmission. The memory 120 is connected to the processor 110, and it stores various pieces of information for driving the processor 110. The RF unit 130 is connected to the processor 110, and it transmits and/or receives radio signals.

UE 200 includes a processor 210, memory 220, and an RF unit 230. The UE 200 may be MTC UE. The processor 210 implements the proposed functions, processes and/or methods. For example, the processor 210 can receive a data DCI format in an existing control region PDCCH region or a control region (E-PDCCH region) that is newly added to a data region. That is, the processor 210 can detect/receive a data DCI format in the PDCCH region or the E-PDCCH region through blind decoding. Although an HARQ combination is not used, the processor 210 can send ACK for a data DCI format to a BS. Here, the processor 210 can determine the transmit power of the ACK using a value of a TPC field included in the data DCI format. The memory 220 is connected to the processor 210, and it stores various pieces of information for driving the processor 210. The RF unit 230 is connected to the processor 210, and it transmits and/or receives radio signals.

The processor 110, 210 may include Application-Specific Integrated Circuits (ASICs), other chipsets, logic circuits, data processing devices and/or converters for mutually converting baseband signals and radio signals. The memory 120, 220 may include Read-Only Memory (ROM), Random Access Memory (RAM), flash memory, memory cards, storage media and/or other storage devices. The RF unit 130, 230 may include one or more antennas for transmitting and/or receiving radio signals. When an embodiment is implemented in software, the above-described scheme may be implemented as a module (process, function, etc.) for performing the above-described function. The module may be stored in the memory 120, 220 and executed by the processor 110, 210. The memory 120, 220 may be placed inside or outside the processor 110, 210 and connected to the processor 110, 210 using a variety of well-known means.

Although the some embodiments of the present invention have been described above, a person having ordinary skill in the art will appreciate that the present invention may be modified and changed in various ways without departing from the technical spirit and scope of the present invention. Accordingly, the present invention is not limited to the embodiments and it may be said that the present invention includes all embodiments within the scope of the claims below.

What is claimed is:

1. A method of transmitting data in a wireless communication system, the method comprising:
    configuring a subframe comprising a control region and a data region;
    transmitting first data for a first user equipment (UE) in the data region; and
    transmitting second data for a second UE in the control region,
    wherein the subframe further comprises a plurality of Orthogonal Frequency Division Multiplexing (OFDM) symbols in a time domain,
    wherein the control region comprises a first N OFDM symbols in the subframe and the data region comprises OFDM symbols other than the first N OFDM symbols in the subframe, N being a natural number 4 or less,
    wherein the first data is scheduled according to scheduling information transmitted in the control region,
    wherein the second data has no corresponding scheduling information in the control region,
    wherein the scheduling information and the second data always have a same bit size, and
    wherein the scheduling information and the second data each comprise a 1-bit indicator having a fixed bit size and the second data is distinguished from the scheduling information by a value of the indicator.

2. The method of claim 1, wherein:
    the scheduling information is masked as a first identifier (ID);
    the second data is masked as a second ID; and
    the first ID and the second ID are different UE-specific IDs.

3. The method of claim 1, further comprising receiving an acknowledgement (ACK) for the second data.

4. The method of claim 3, wherein:
    the second data comprises a Transmission Power Control (TPC) field; and
    the TPC field indicates a transmission power value of the ACK.

5. The method of claim 1, further comprising:
    configuring a search space that is a radio resource region; and
    transmitting the second data in the configured search space.

6. The method of claim 1, further comprising:
    configuring an additional control region within the data region; and
    transmitting the second data in the configured additional control region.

7. The method of claim 1, wherein:
    the second data comprises a New Data Indicator (NDI) field of at least 2 bits; and
    a value of the NDI field indicates whether the second data is newly transmitted data or retransmitted data.

8. The method of claim 7, wherein:
    the NDI field has a different bit value depending upon whether the second data is newly transmitted data or retransmitted data.

9. The method of claim 1, wherein the second data is a smaller amount of data than the first data.

10. The method of claim 1, further comprising:
    configuring a first search space that is a radio resource region and transmitting the scheduling information in the configured first search space; and
    configuring a second search space that is a radio resource region distinguished from the configured first search space and transmitting the second data in the configured second search space.

11. A data transmission apparatus, comprising:
    a Radio Frequency (RF) unit transmitting and receiving radio signals; and
    a processor connected to the RF unit,
    wherein the processor:
        configures a subframe comprising a control region and a data region;
        controls the RF unit to transmit first data for a first user equipment (UE) in the data region; and
        controls the RF unit to transmit second data for a second UE in the control region,
    wherein the subframe further comprises a plurality of Orthogonal Frequency Division Multiplexing (OFDM) symbols in a time domain,
    wherein the control region comprises a first N OFDM symbols in the subframe and the data region comprises OFDM symbols other than the first N OFDM symbols in the subframe, N being a natural number 4 or less,
    wherein the first data is scheduled according to scheduling information transmitted in the control region,
    wherein the second data has no corresponding scheduling information in the control region,
    wherein the scheduling information and the second data always have a same bit size, and wherein the scheduling information and the second data each comprise a 1-bit indicator having a fixed bit size and the second data is distinguished from the scheduling information by a value of the indicator.

12. The apparatus of claim 11, wherein:
the scheduling information is masked as a first identifier (ID);
the second data is masked as a second ID; and
the first ID and the second ID are different UE-specific IDs.

13. The apparatus of claim 11, wherein the processor further:
configures a search space that is a radio resource region; and
controls the RF unit to transmit the second data in the configured search space.

14. The apparatus of claim 11, wherein the processor further:
configures an additional control region within the data region; and
controls the RF unit to transmit the second data in the configured additional control region.

15. The apparatus of claim 11, wherein the processor further:
configures a first search space that is a radio resource region and controls the RF unit to transmit the scheduling information in the configured first search space; and
configures a second search space that is a radio resource region distinguished from the configured first search space and controls the RF unit to transmit the second data in the configured second search space.

16. The apparatus of claim 11, wherein the processor further controls the RF unit to receive an acknowledgment (ACK) for the second data.

17. The apparatus of claim 16, wherein:
the second data comprises a Transmission Power Control (TPC) field; and
the TPC field indicates a transmission power value of the ACK.

18. The apparatus of claim 11, wherein:
the second data comprises a New Data Indicator (NDI) field of at least 2 bits; and
a value of the NDI field indicates whether the second data is newly transmitted data or retransmitted data.

19. The apparatus of claim 18, wherein:
the NDI field has a different bit value depending upon whether the second data is newly transmitted data or retransmitted data.

20. The apparatus of claim 11, wherein the second data is a smaller amount of data than the first data.

* * * * *